(12) United States Patent
Oikawa

(10) Patent No.: US 9,769,219 B2
(45) Date of Patent: Sep. 19, 2017

(54) TERMINAL MANAGEMENT SYSTEM, COMMUNICATION SYSTEM, TERMINAL REGISTRATION CONTROLLING METHOD, AND RECORDING MEDIUM STORING TERMINAL REGISTRATION CONTROLLING PROGRAM

(71) Applicant: Tatsuyuki Oikawa, Kanagawa (JP)

(72) Inventor: Tatsuyuki Oikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 134 days.

(21) Appl. No.: 14/657,459

(22) Filed: Mar. 13, 2015

(65) Prior Publication Data
US 2015/0271214 A1 Sep. 24, 2015

(30) Foreign Application Priority Data

Mar. 18, 2014 (JP) .................................. 2014-054312

(51) Int. Cl.
*H04L 29/06* (2006.01)
(52) U.S. Cl.
CPC ...... *H04L 65/1069* (2013.01); *H04L 65/1073* (2013.01); *H04L 65/1059* (2013.01)
(58) Field of Classification Search
CPC .................................................... H04L 65/10
See application file for complete search history.

(56) References Cited

U.S. PATENT DOCUMENTS

| 8,861,377 | B2 * | 10/2014 | Okuyama | ........... H04L 65/1069 370/244 |
|---|---|---|---|---|
| 2002/0105946 | A1 * | 8/2002 | Takeuchi | ............ H04L 29/1216 370/352 |
| 2006/0087990 | A1 * | 4/2006 | Kakivaya | ................ H04L 45/02 370/299 |
| 2010/0040042 | A1 * | 2/2010 | van Greunen | ....... H04B 1/7156 370/350 |
| 2010/0202445 | A1 * | 8/2010 | Itaba | ................... H04L 65/1073 370/352 |

(Continued)

FOREIGN PATENT DOCUMENTS

| JP | 2005-202524 | 7/2005 |
|---|---|---|
| JP | 2013-085208 | 5/2013 |

*Primary Examiner* — Xavier Szewai Wong
(74) *Attorney, Agent, or Firm* — Oblon, McClelland, Maier & Neustadt, L.L.P.

(57) ABSTRACT

A terminal management system transmits identification information for identifying a first communication terminal to one or more of a plurality of communication terminals, in response to receiving from the first communication terminal a notification that the first communication terminal is waiting to be registered as a candidate counterpart communication terminal. In response to receiving, from a second communication terminal of the one or more of the plurality of communication terminals, a request for adding the first communication terminal as a candidate counterpart communication terminal of the second communication terminal, the terminal management system stores the identification information of the first communication terminal in association with identification information of the second communication terminal to register the first communication terminal as a candidate counterpart communication terminal of the second communication terminal.

11 Claims, 20 Drawing Sheets

(56) References Cited

U.S. PATENT DOCUMENTS

| | | | |
|---|---|---|---|
| 2013/0170336 A1* | 7/2013 | Chen | H04L 41/12 370/221 |
| 2015/0055653 A1* | 2/2015 | Suryavanshi | H04L 65/1073 370/392 |
| 2015/0085856 A1* | 3/2015 | Bouvet | H04L 65/1016 370/352 |

* cited by examiner

FIG. 7

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG. 8

TERMINAL MANAGEMENT TABLE

| TERMINAL ID | TERMINAL NAME | OPERATION STATE | IP ADDRESS |
|---|---|---|---|
| 01aa | AA TERMINAL, TOKYO OFFICE, JAPAN | ONLINE (COMMUNICATION OK) | 1.2.1.3 |
| 01ab | AB TERMINAL, TOKYO OFFICE, JAPAN | OFFLINE | 1.2.1.4 |
| ... | ... | ... | ... |
| 01ba | BA TERMINAL, OSAKA OFFICE, JAPAN | ONLINE (COMMUNICATION OK) | 1.2.2.3 |
| 01bb | BB TERMINAL, OSAKA OFFICE, JAPAN | ONLINE (COMMUNICATION OK) | 1.2.2.4 |
| ... | ... | ... | ... |
| 01ca | CA TERMINAL, NEW YORK OFFICE, U.S. | OFFLINE | 1.3.1.3 |
| 01cb | CB TERMINAL, NEW YORK OFFICE, U.S. | ONLINE (COMMUNICATING) | 1.3.1.4 |
| ... | ... | ... | ... |
| 01da | DA TERMINAL, WASHINGTON D.C. OFFICE, U.S. | OFFLINE | 1.3.2.3 |
| 01db | DB TERMINAL, WASHINGTON D.C. OFFICE, U.S. | ONLINE (COMMUNICATING) | 1.3.2.4 |
| ... | ... | ... | ... |

FIG. 9

CANDIDATE LIST MANAGEMENT TABLE

| TERMINAL ID OF REQUEST SENDER TERMINAL | TERMINAL ID OF COUNTERPART TERMINAL |
|---|---|
| 01aa | 01ab, 01ba, 01db |
| 01ab | 01aa, 01ca, 01cb |
| ... | ... |
| 01ba | 01aa, 01ab, 01ca, 01da, 01db |
| ... | ... |
| 01db | 01aa, 01ab, 01ba, ..., 01ca, 01cb, ..., 01da |

FIG. 10

WAITING LIST MANAGEMENT TABLE

| TERMINAL ID OF WAITING TERMINAL | TERMINAL NAME | LOCATION | WAITING TIME |
|---|---|---|---|
| 01aa | abc | TOKYO | 0:00:10 |
| ... | ... | ... | ... |
| 01bb | xyz | OSAKA | 0:02:00 |
| ... | ... | ... | ... |

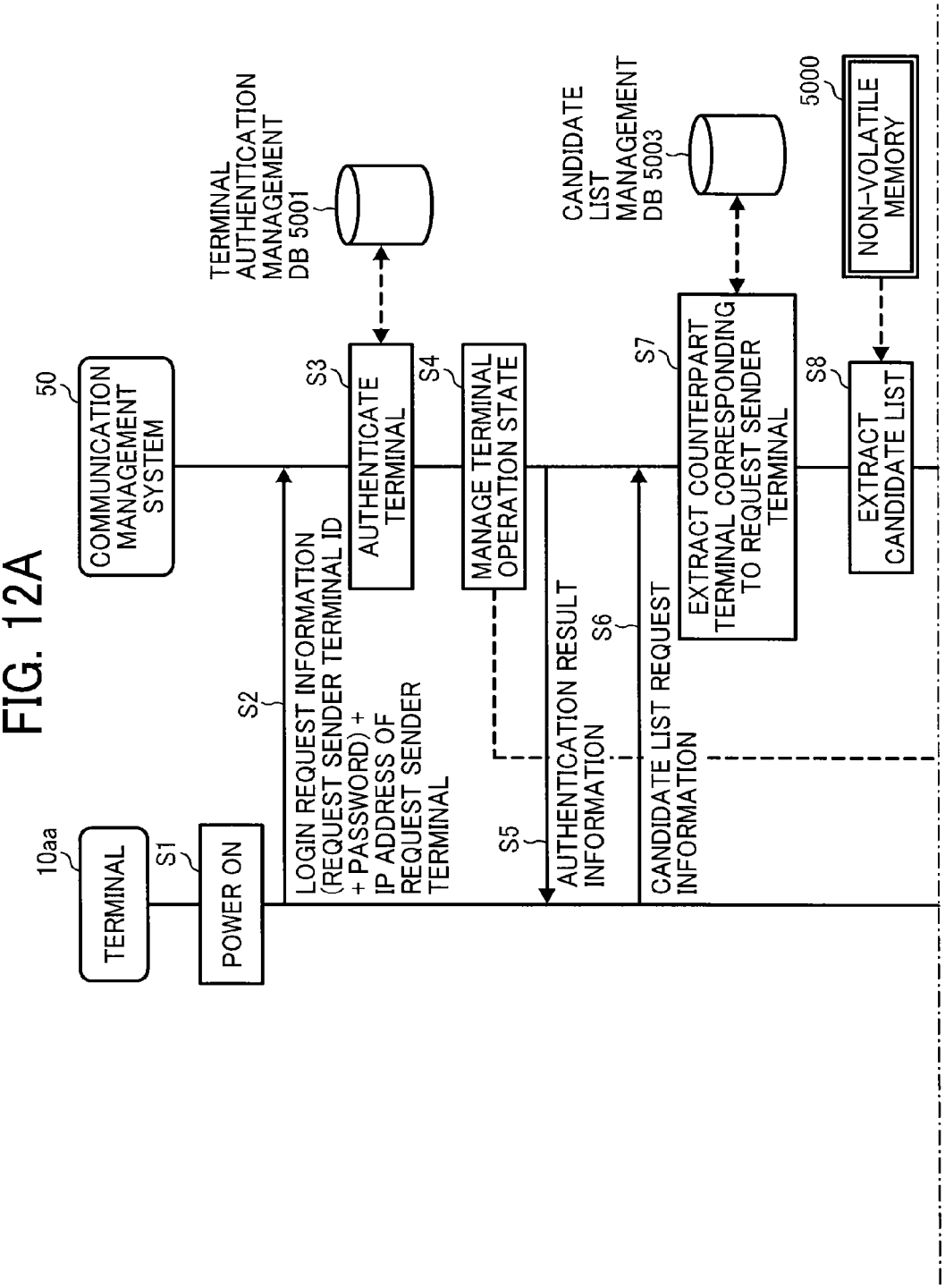

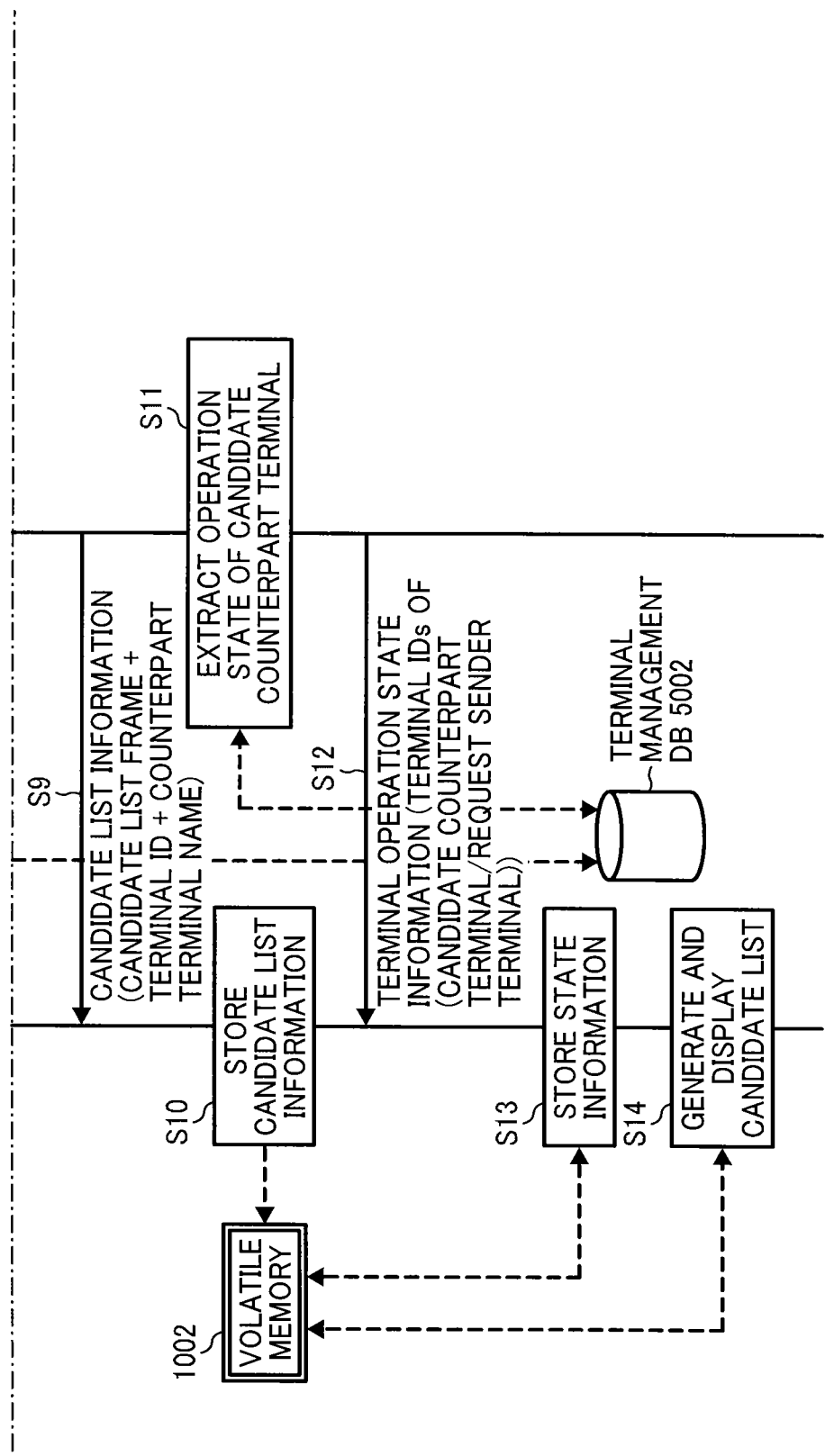

FIG. 13
| STATE | TERMINAL ID | TERMINAL NAME |
|---|---|---|
|  | 10ab | AB TERMINAL, TOKYO OFFICE, JAPAN |
|  | 10ba | BA TERMINAL, OSAKA OFFICE, JAPAN |
|  | 10db | DB TERMINAL, WASHINGTON D.C. OFFICE, U.S. |

TERMINAL MANAGEMENT SYSTEM, COMMUNICATION SYSTEM, TERMINAL REGISTRATION CONTROLLING METHOD, AND RECORDING MEDIUM STORING TERMINAL REGISTRATION CONTROLLING PROGRAM

CROSS-REFERENCE TO RELATED APPLICATIONS

This patent application is based on and claims priority pursuant to 35 U.S.C. §119(a) to Japanese Patent Application No. 2014-054312, filed on Mar. 18, 2014, in the Japan Patent Office, the entire disclosure of which is hereby incorporated by reference herein.

BACKGROUND

Technical Field

The present invention relates to managing information regarding a candidate counterpart communication terminal for a communication terminal.

Description of the Related Art

In recent years, due to a demand for reducing business trip costs and time, communication systems that perform communication such as to perform a videoconference via a communication network such as the Internet or a dedicated line have become popular. When communication is started between a plurality of communication terminals in such a communication system, image data and sound data are transmitted/received, to carry out a videoconference.

There has also been available a method of managing, by using a candidate list, a candidate counterpart communication terminal to which a communication terminal is capable of requesting to start communication. The candidate counterpart communication terminal is added to the candidate list when an approval from a candidate counterpart communication terminal is obtained, thereby ensuring security.

In the case of adding another communication terminal to the candidate list as a candidate counterpart communication terminal, the user at the communication terminal asks about information regarding the candidate counterpart communication terminal that is necessary for the addition, such as terminal identification information. The communication terminal then gives a request to add this other communication terminal by using the obtained information.

SUMMARY

A terminal management system transmits identification information for identifying a first communication terminal to one or more of a plurality of communication terminals, in response to receiving from the first communication terminal a notification that the first communication terminal is waiting to be registered as a candidate counterpart communication terminal. In response to receiving, from a second communication terminal of the one or more of the plurality of communication terminals, a request for adding the first communication terminal as a candidate counterpart communication terminal of the second communication terminal, the terminal management system stores the identification information of the first communication terminal in association with identification information of the second communication terminal to register the first communication terminal as a candidate counterpart communication terminal of the second communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 7 is an illustration of a terminal authentication management table;

FIG. 8 is an illustration of a terminal management table;

FIG. 9 is an illustration of a candidate list management table;

FIG. 10 is an illustration of a waiting list management table;

FIGS. 12A and 12B (FIG. 12) are a sequence diagram illustrating a process at a preparation stage for starting communication between terminals;

FIG. 13 is an illustration of a candidate list;

Figure 1:
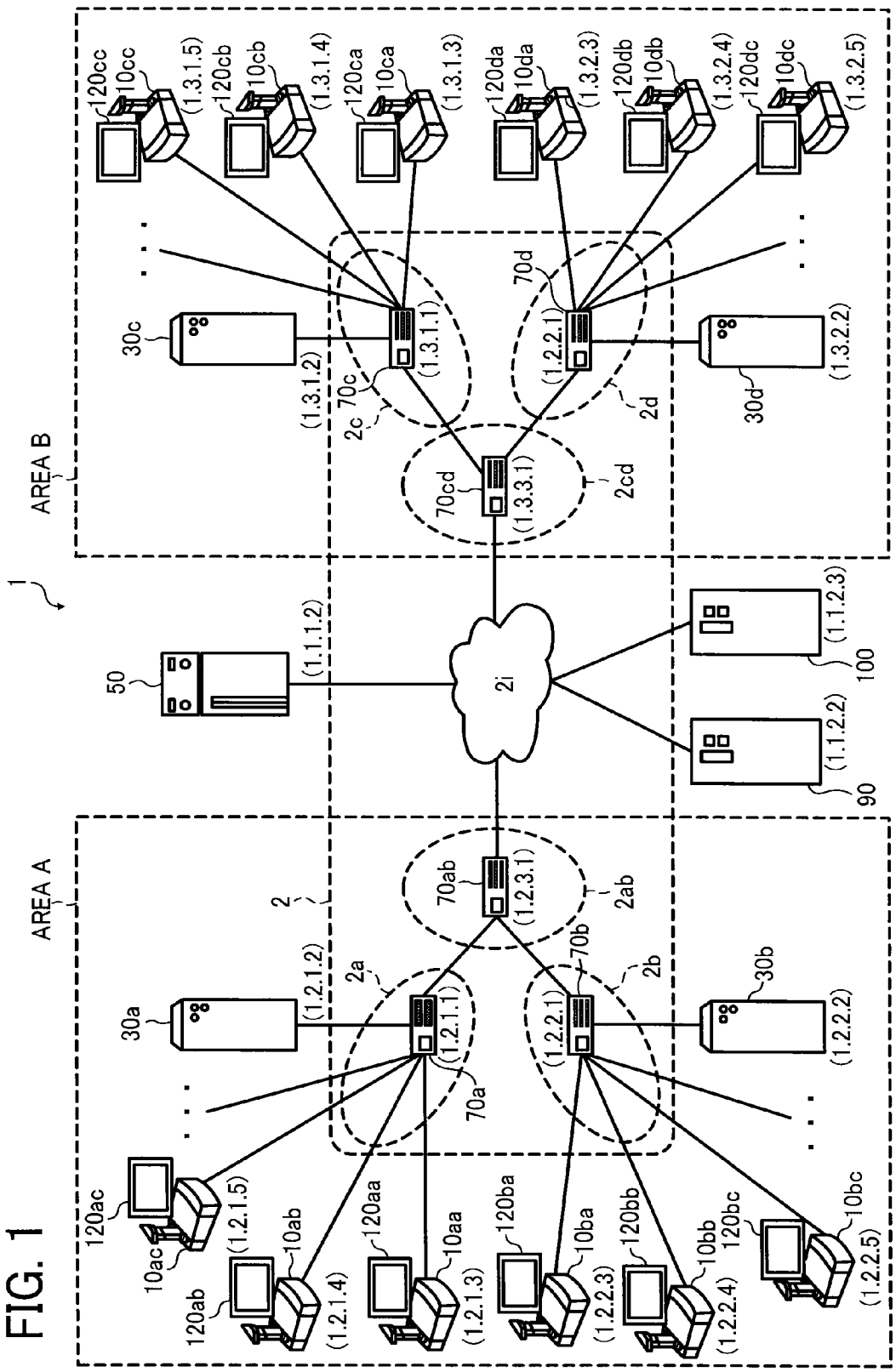
FIG. 1 is a schematic configuration diagram of a communication system according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like. These terms in general may be referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Hereinafter, an embodiment of the present invention will be described with reference to the drawings.

Figure 2:
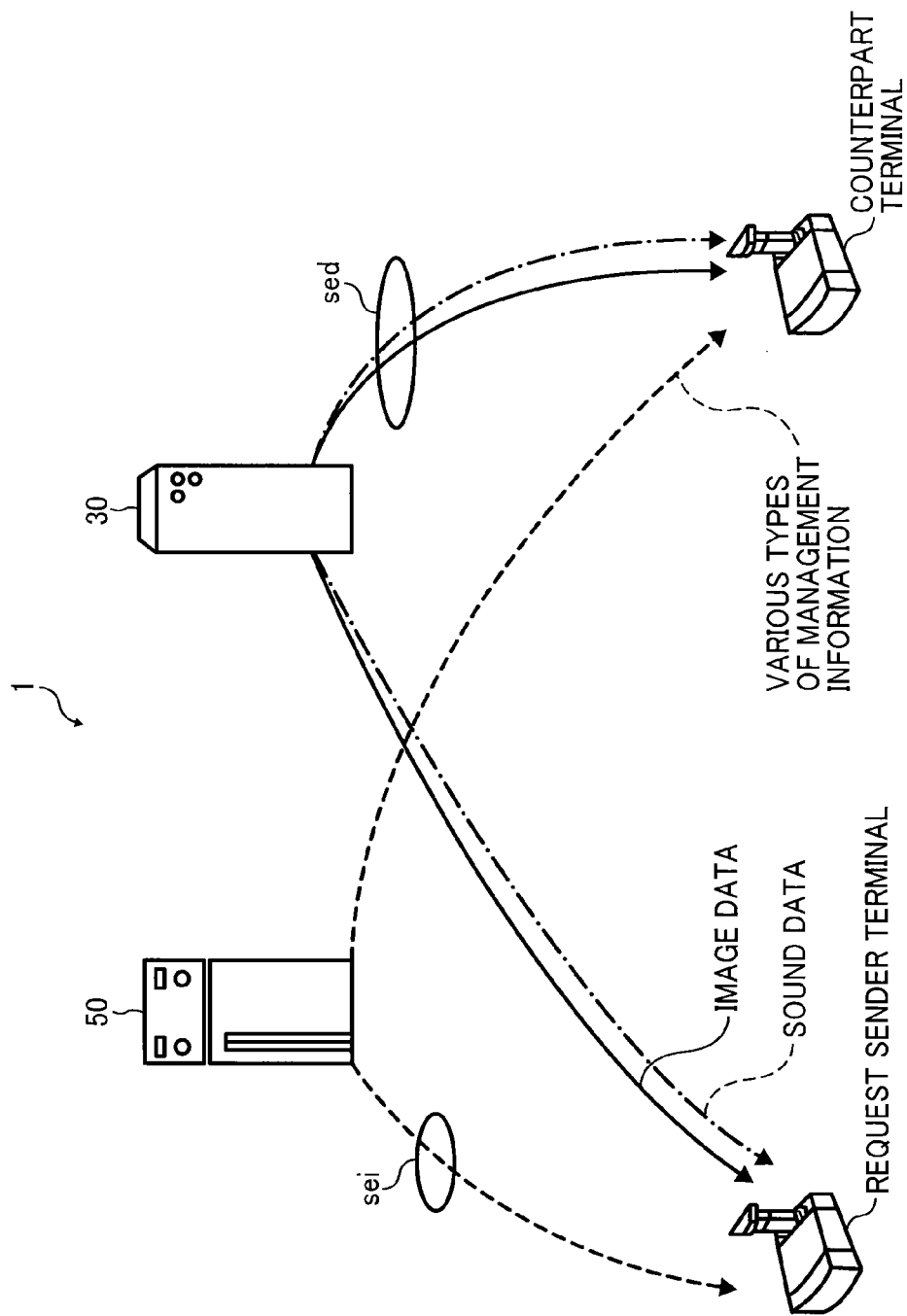
FIG. 2 is an illustration of transmission/reception of image data, sound data, and various types of management information in the communication system according to the embodiment of the present invention.

FIG. 1 is a schematic configuration diagram of a communication system 1 according to an embodiment of the present invention. FIG. 2 is an illustration of transmission/reception of image data, sound data, and various types of management information in the communication system.

The communication system 1 includes a communication system that intercommunicates information, information that reflects feelings, or the like between a plurality of communication terminals 10 via a communication management system 50. Examples of the communication system include a videoconference system and a teleconference system.

In the embodiment, the communication system, the communication management system, and the communication terminal will be described while assuming a videoconference system serving as an example of the communication system, a videoconference management system serving as the communication management system, and a videoconference terminal serving as an example of the communication terminal. That is, the communication terminal and the communication management system according to the embodiment of the present invention are applied not only to a videoconference system, but also to another communication system. Although the example in the embodiment is described as a "videoconference", this may alternatively be referred to as a "teleconference", and the two terms mean the same thing.

Also in the embodiment, the case in which users in the communication system 1 include four offices, namely, a Tokyo office, an Osaka office, a New York office, and a Washington D.C. office, will be described.

First, the communication system illustrated in FIG. 1 includes a plurality of communication terminals (10aa, 10ab, . . . ), displays (120aa, 120ab, . . . ) for the individual communication terminals (10aa, 10ab, . . . ), a plurality of relay devices (30a, 30b, 30c, and 30d), the communication management system 50, a program providing system 90, and a maintenance system 100.

The plurality of communication terminals 10 perform communication by transmitting and receiving image data and sound data serving as examples of content data.

Hereinafter, the "communication terminal" is simply represented as the "terminal". In addition, an arbitrary one or ones of the plurality of terminals (10aa, 10ab, . . . ) is/are represented as a "terminal(s) 10". An arbitrary one or ones of the plurality of displays (120aa, 120ab, . . . ) is/are represented as a "display(s) 120". An arbitrary one or ones of the plurality of relay devices (30a, 30b, 30c, and 30d) is/are represented as a "relay device(s) 30". Further, a terminal serving as a request sender that gives a request to start a videoconference is represented as a "request sender terminal", and a terminal serving as a counterpart terminal that is a request destination (relay destination) is represented as a "counterpart terminal". Hereinafter, the "communication management system" may simply be represented as the "management system".

In addition, as illustrated in FIG. 2, a management information session sei for transmitting and receiving various types of management information is established via the management system 50 between a request sender terminal and a counterpart terminal in the communication system 1. A session for transmitting and receiving each of image data and sound data via a corresponding one of the relay devices 30 is also established between the request sender terminal and the counterpart terminal. Here, these sessions are collectively indicated as a content data session sed.

The relay devices 30 illustrated in FIG. 1 relay content data between the plurality of terminals 10. The management system 50 collectively manages login authentication from the terminals 10, the communication states, candidate lists, and so forth of the terminals 10, and the communication states and so forth of the relay devices 30. Note that an image of image data may be a moving image or a still image, or may include both thereof.

A plurality of routers (70a, 70b, 70c, 70d, 70ab, and 70cd) select an optimal path for image data and sound data. Hereinafter, an arbitrary one or ones of the routers (70a, 70b, 70c, 70d, 70ab, and 70cd) is/are represented as a "router(s) 70".

The program providing system 90 includes a hard disk (HD) 204 described later. The HD 204 stores a terminal program for causing a terminal 10 to realize various functions (or for causing a terminal 10 to function as various elements), and the terminal program can be transmitted to the terminal 10. In addition, the HD 204 of the program providing system 90 stores a relay device program for causing a relay device 30 to realize various functions (or for causing a relay device 30 to function as various elements), and the relay device program can be transmitted to the relay device 30. Further, the HD 204 of the program providing system 90 stores a communication management program for causing the management system 50 to realize various functions (or for causing the management system 50 to function as various elements), and the communication management program can be transmitted to the management system 50.

The maintenance system 100 is one or more computers for performing maintenance, management, or conservation of at least one of the terminals 10, the relay devices 30, the management system 50, and the program providing system 90. For example, in the case where the maintenance system 100 is located in one country, and the terminals 10, the relay devices 30, the management system 50, or the program providing system 90 is/are located outside that country, the maintenance system 100 remotely performs, via a communication network 2, maintenance, management, or conservation of at least one of the terminals 10, the relay devices 30, the management system 50, and the program providing system 90. In addition, the maintenance system 100 performs maintenance such as management of the modal number, serial number, sales contact, maintenance checkup, or a past history of failures of at least one of the terminals 10, the relay devices 30, the management system 50, and the program providing system 90 without having the communication network 2 therebetween.

The terminals (10aa, 10ab, 10ac, . . . ), the relay device 30a, and the router 70a are connected to be communicable with each other by a local area network (LAN) 2a. The terminals (10ba, 10bb, 10bc, . . . ), the relay device 30b, and the router 70b are connected to be communicable with each other by a LAN 2b. In addition, the LAN 2a and the LAN 2b are connected to be communicable with each other by a dedicated line 2ab including the router 70ab and are configured in a certain area A. For example, the area A is Japan, the LAN 2a is configured in the office in Tokyo, and the LAN 2b is configured in the office in Osaka.

The terminals (10ca, 10cb, 10cc, . . . ), the relay device 30c, and the router 70c are connected to be communicable with each other by a LAN 2c. The terminals (10da, 10db, 10dc, . . . ), the relay device 30d, and the router 70d are connected to be communicable with each other by a LAN 2d. In addition, the LAN 2c and the LAN 2d are connected to be communicable with each other by a dedicated line 2cd including the router 70cd and are configured in a certain area B. For example, the area B is the United States, the LAN 2c is configured in the office in New York, and the LAN 2d is configured in the office in Washington D.C. The area A and the area B are connected to be communicable with each other from the routers (70ab and 70cd), respectively, via the Internet 2i.

In addition, the management system 50 and the program providing system 90 are connected to be communicable with the terminals 10 and the relay devices 30 via the Internet 2i. The management system 50 and the program providing system 90 may be located in the area A or the area B, or may be located in other areas.

In the embodiment, the communication network 2 of the embodiment includes the LAN 2a, the LAN 2b, the dedicated line 2ab, the Internet 2i, the dedicated line 2cd, the LAN 2c, and the LAN 2d. The communication network 2 may include not only a wired network, but also a network where communication is performed wirelessly, such as Wireless Fidelity (WiFi) or Bluetooth (registered trademark).

In addition in FIG. 1, four digits indicated below each of the terminals 10, each of the relay devices 30, the management system 50, each of the routers 70, and the program providing system 90 indicates an IP address in an abbreviated form in the general Internet Protocol version 4 (IPv4). For example, the IP address of the terminal 10aa is "1.2.1.3". Although IPv6 may be used instead of IPv4, IPv4 is used in order to make the description simple.

Note that the terminals 10 may be used not only for communication between different offices or for communication between different rooms in the same office, but also for communication within the same room or for outdoor-indoor communication or outdoor-outdoor communication. In the case where the terminals 10 are used outside, wireless communication using a mobile phone communication network or the like is performed.

<Hardware Configuration of Communication System>

Figure 3:
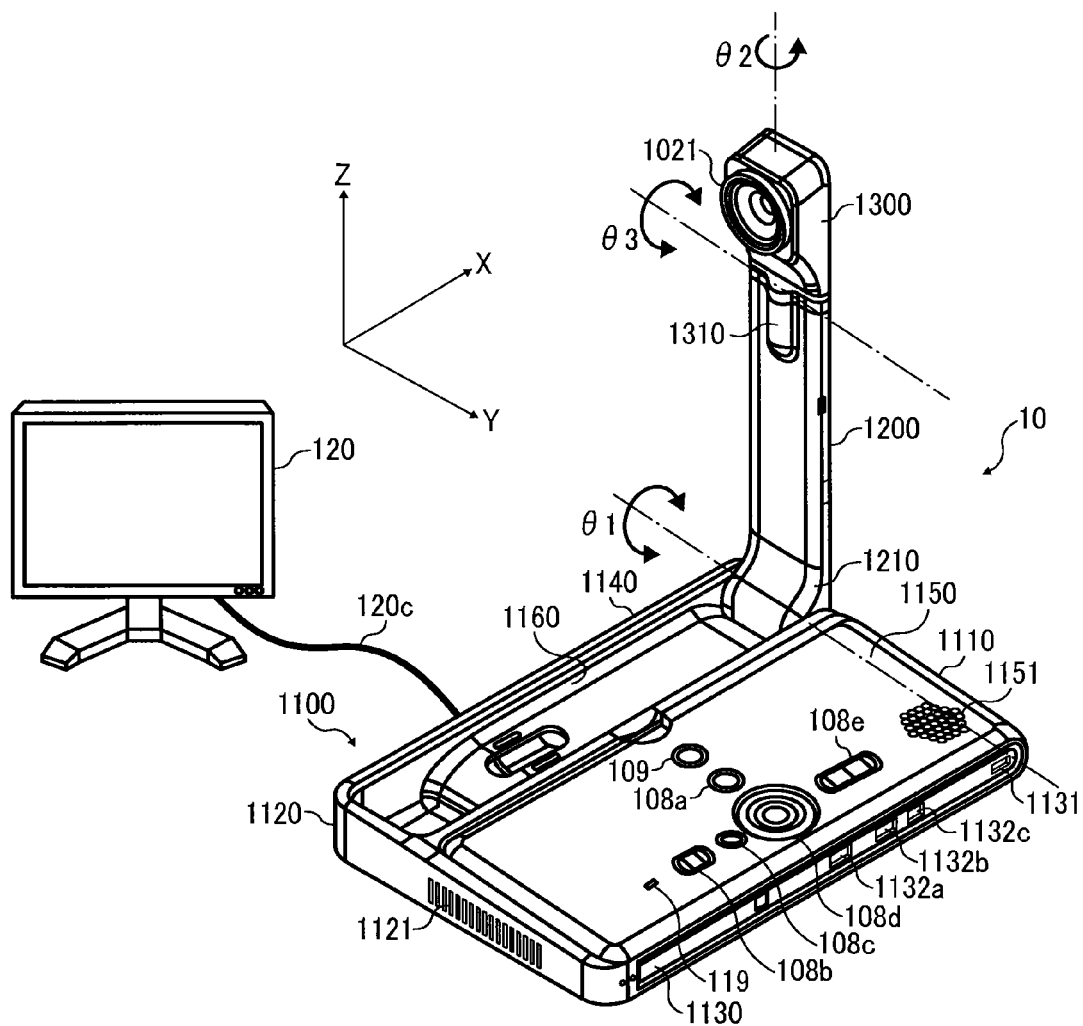
FIG. 3 is an external view of a communication terminal according to the embodiment of the present invention.

Next, the hardware configuration of the communication system 1 will be described. FIG. 3 is an external view of a terminal 10 according to the embodiment. The description will be given assuming that the longitudinal direction of the terminal 10 is the X-axis direction, a direction orthogonal to the X-axis direction on one plane is the Y-axis direction, and a direction orthogonal to the X-axis direction and the Y-axis direction (vertical direction) is the Z-axis direction.

As illustrated in FIG. 3, the terminal 10 includes a casing 1100, an arm 1200, and a camera housing 1300. Among these portions, a front wall 1110 of the casing 1100 has an inlet face including a plurality of inlet holes, and a back wall 1120 of the casing 1100 has an exhaust face 1121 on which a plurality of exhaust holes are formed. Accordingly, by driving of a cooling fan included in the casing 1100, air behind the terminal 10 can be taken in via the inlet face and exhausted to the rear of the terminal 10 via the exhaust face 1121. A right-side wall 1130 of the casing 1100 has a sound pickup hole 1131 formed thereon, and a built-in microphone 114, described later, is capable of picking up sound and noise.

An operation panel 1150 is formed toward the right-side wall 1130 of the casing 1100. The operation panel 1150 has a plurality of operation keys (108a to 108e) described later, a power switch 109 described later, and a clock 119 described later, which are formed thereon. In addition, the operation panel 1150 has a sound output face 1151 formed thereon, which is formed of a plurality of sound output holes for allowing output sound from a built-in a speaker 115 described later to pass through. In addition, an accommodation portion 1160 serving as a recess for accommodating the arm 1200 and the camera housing 1300 is formed toward a left-side wall 1140 of the casing 1100. A plurality of connection ports (1132a to 1132c) for electrically connecting cables to an external device connection interface (I/F) 118 described later are provided on the right-side wall 1130 of the casing 1100. In contrast, a connection port for electrically connecting a cable 120c for a display 120 to the external device connection I/F 118 described later is provided toward the left-side wall 1140 of the casing 1100.

The following description uses the term "operation key(s) 108" for indicating an arbitrary one or ones of the operation keys (108a to 108e), and the term "connection port(s) 1132" for indicating an arbitrary one or ones of the connection ports (1132a to 1132c).

Next, the arm 1200 is attached to the casing 1100 via a torque hinge 1210 and is configured to be rotatable in the vertical direction within a range of a tilt angle θ1 of 135 degrees with respect to the casing 1100. FIG. 3 indicates a state in which the tilt angle θ1 is 90 degrees.

The camera housing 1300 has a built-in camera 112 provided thereon, which will be described later, and the camera 112 can capture an image of a user, a document, a room, or the like. In addition, the camera housing 1300 has a torque hinge 1310 formed thereon. The camera housing 1300 is attached to the arm 1200 via the torque hinge 1310 and is configured to be rotatable in the vertical and horizontal directions within a range of a pan angle θ2 of ±180 degrees and a tilt angle θ3 of ±45 degrees with respect to the state illustrated in FIG. 3 serving as 0 degrees.

Since the relay devices 30, the management system 50, the program providing system 90, and the maintenance system 100 each have the same appearance as that of a general server computer, descriptions of the appearances thereof are omitted.

Figure 4:
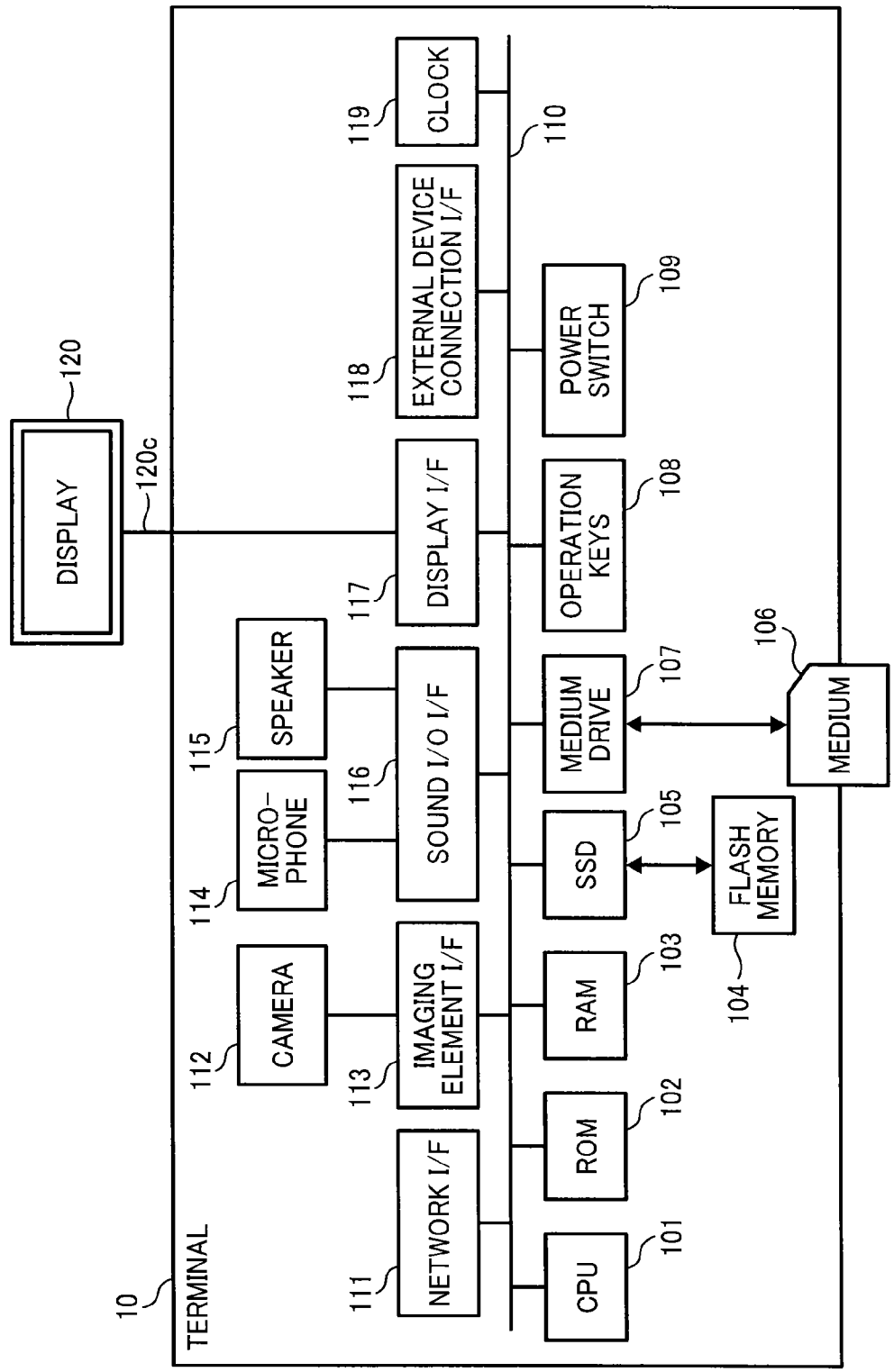
FIG. 4 is a hardware configuration diagram of the communication terminal according to the embodiment of the present invention.

FIG. 4 is a hardware configuration diagram of a terminal 10 according to the embodiment of the present invention. As illustrated in FIG. 4, the terminal 10 of the embodiment includes a central processing unit (CPU) 101 that controls the overall operation of the terminal 10, a read-only memory (ROM) 102 that stores a program used for driving the CPU 101, such as an initial program loader (IPL), a random-access memory (RAM) 103 used as a work area for the CPU 101, a flash memory 104 that stores various types of data, such as the terminal program, image data, and sound data, a solid state drive (SSD) 105 that controls reading/writing of various types of data from/to the flash memory 104 under control of the CPU 101, a medium drive 107 that controls reading/writing (storage) of data from/to a recording medium 106 such as a flash memory, the operation keys 108 operated in the case of, for example, selecting a counterpart terminal of the terminal 10, the power switch 109 for turning on/off the power of the terminal 10, and a network interface (I/F) 111 for performing data communication using the communication network 2.

In addition, the terminal 10 includes the built-in camera 112, which captures an image of a subject and obtains image data under control of the CPU 101, an imaging element I/F 113 that controls driving of the camera 112, the built-in microphone 114, which receives a sound input, the built-in speaker 115, which outputs sound, a sound input/output I/F 116 that processes inputting/outputting of a sound signal between the microphone 114 and the speaker 115 under control of the CPU 101, a display I/F 117 that transmits image data to an external display 120 under control of the CPU 101, the external device connection I/F 118 connected to a connection port 1021g illustrated in FIG. 3 in order to connect various external devices, a clock 119 that outputs a clock signal, and a bus line 110 such as an address bus and a data bus for electrically connecting the above-described elements as illustrated in FIG. 4.

The display 120 displays an image of a subject, an operation icon, or the like, and is a liquid crystal display, an organic electroluminescence (EL) display, or the like. In addition, the display 120 is connected to the display I/F 117 by the cable 120c. The cable 120c may be an analog red green blue (RGB) (video graphic array (VGA)) signal cable, a component video cable, a high-definition multimedia interface (HDMI) signal cable, or a digital video interactive (DVI) signal cable.

The camera 112 includes a lens and a solid-state imaging element that converts an image (video) of a subject to electronic data by converting light to electric charge. As the solid-state imaging element, for example, a complementary metal-oxide-semiconductor (CMOS) or a charge-coupled device (CCD) is used.

The external device connection I/F 118 is capable of connecting an external device such as an external camera, an external microphone, or an external speaker by using a Universal Serial Bus (USB) cable or the like. In the case where an external camera is connected, the external camera is driven in preference to the built-in camera 112 under control of the CPU 101. Similarly, in the case where an external microphone is connected or an external speaker is connected, the external microphone or the external speaker is driven in preference to the built-in microphone 114 or the built-in speaker 115 under control of the CPU 101.

Note that the recording medium 106 is configured to be removable from the terminal 10. In addition, a non-volatile memory that reads or writes data under control of the CPU 101 is not limited to the flash memory 104, and an electrically erasable and programmable read-only memory (EEPROM) may be used instead.

Further, the terminal program may be recorded in a file in an installable format or an executable format on a computer-readable recording medium such as the recording medium 106 and circulated. In addition, the terminal program may be stored on the ROM 102, instead of the flash memory 104.

Figure 5:
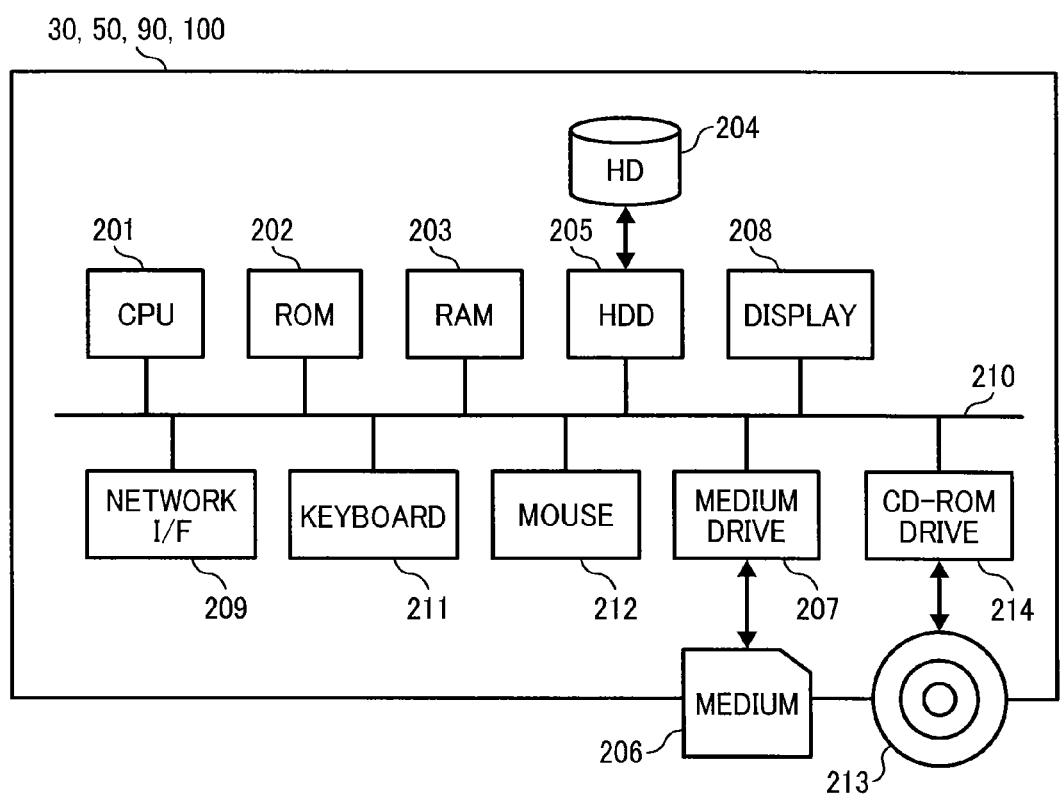
FIG. 5 is a hardware configuration diagram of a communication management system, a relay device, or a program providing system according to the embodiment of the present invention.

FIG. 5 is a hardware configuration diagram of the management system 50 according to the embodiment of the present invention. The management system 50 includes a CPU 201 that controls the overall operation of the management system 50, a ROM 202 that stores a program used for driving the CPU 201, such as an IPL, a RAM 203 used as a work area for the CPU 201, an HD 204 that stores various types of data, such as the communication management program, a hard disk drive (HDD) 205 that controls reading/writing of various types of data from/to the HD 204 under control of the CPU 201, a medium drive 207 that controls reading/writing (storage) of data from/to a recording medium 206 such as a flash memory, a display 208 that displays various types of information such as a cursor, a menu, a window, characters, or an image, a network I/F 209 for communicating data using the communication network 2, a keyboard 211 including a plurality of keys for entering characters, numerals, and various instructions, a mouse 212 that selects and executes various instructions, selects a processing target, and moves the cursor, a compact disc read-only memory (CD-ROM) drive 214 that controls reading/writing of various types of data from/to a CD-ROM 213 serving as an example of a removable recording medium, and a bus line 210 such as an address bus and a data bus for electrically connecting the above-described elements as illustrated in FIG. 5.

Note that the communication management program may be recorded in a file in an installable format or an executable format on a computer-readable recording medium such as the recording medium 206 or the CD-ROM 213 and distributed. In addition, the communication management program may be stored on the ROM 202, instead of the HD 204.

In addition, since the relay devices 30 have a hardware configuration that is the same as or similar to that of the above-described management system 50, a description thereof is omitted. Note that the HD 204 stores a relay device program for controlling the relay devices 30. Also in this case, the relay device program may be recorded in a file in an installable format or an executable format on a computer-readable recording medium such as the recording medium 206 or the CD-ROM 213 and distributed. In addition, the relay device program may be stored on the ROM 202, instead of the HD 204.

In addition, since the program providing system 90 and the maintenance system 100 each have a hardware configuration that is the same as or similar to that of the above-described management system 50, descriptions thereof are omitted. Note that the HD 204 stores a program providing program for controlling the program providing system 90. Also in this case, the program providing program may be recorded in a file in an installable format or an executable format on a computer-readable recording medium such as the recording medium 206 or the CD-ROM 213 and distributed. In addition, the program providing program may be stored on the ROM 202, instead of the HD 204.

Note that each of the above-described programs may be recorded on a computer-readable recording medium such as a compact disc recordable (CD-R), a digital versatile disk (DVD), or a Blu-ray disk, which serve as other examples of the above-described removable recording medium, and may be provided.

<Functional Configuration of Communication System>

Figure 6:
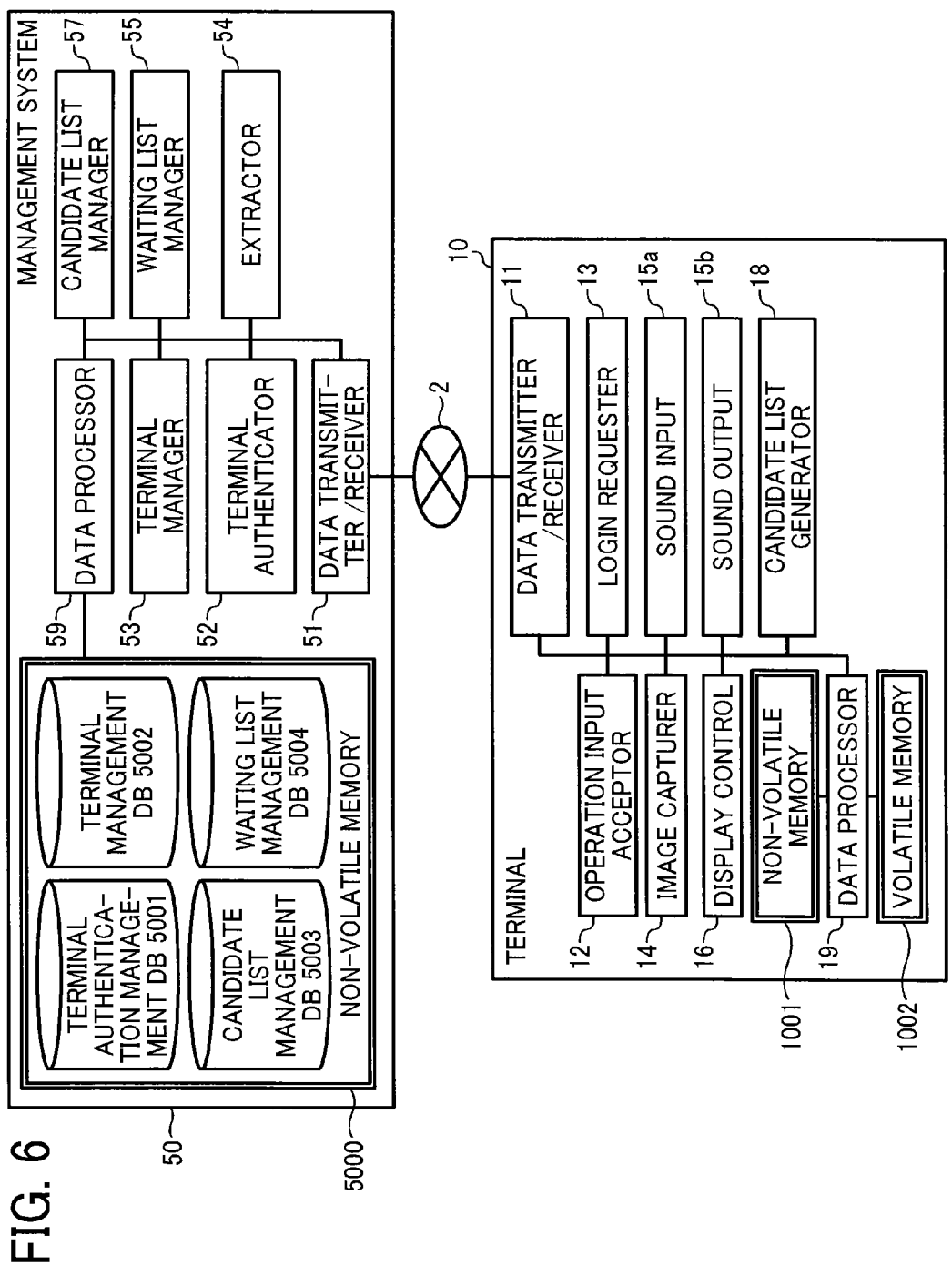
FIG. 6 is a functional block diagram of the communication terminal and the communication management system of the communication system of FIG. 1 according to the embodiment of the present invention.

Next, the functional configuration of the communication system 1 will be described. FIG. 6 is a functional block diagram of a terminal and the management system included in the communication system 1 of the embodiment. In FIG. 6, the terminal 10 and the management system 50 are connected to be capable of communicating data via the communication network 2. In addition, since the program providing system 90 illustrated in FIG. 1 is not directly related to videoconference communication, the program providing system 90 is omitted in FIG. 6.

<Functional Configuration of Terminal>

The terminal 10 includes a data transmitter/receiver 11, an operation input acceptor 12, a login requester 13, an image capturer 14, a sound input 15a, a sound output 15b, a display control 16, a candidate list generator 18, and a data processor 19. These elements are functions that are realized by or elements that are caused to function by operating any of the elements illustrated in FIG. 4 in response to a command from the CPU 101 in accordance with a terminal program expanded from the flash memory 104 to the RAM 103.

In addition, the terminal 10 includes a volatile memory 1002 including the RAM 103 illustrated in FIG. 4, and a non-volatile memory 1001 including the flash memory 104 illustrated in FIG. 4.

Next, using FIGS. 4 and 6, functional configuration of the terminal 10 will be described. Note that, in the following description of functional configuration of the terminal 10, among elements illustrated in FIG. 4, relationships with main elements for realizing the functional configuration of the terminal 10 will also be described.

The data transmitter/receiver 11 of the terminal 10 illustrated in FIG. 6 is realized by a command from the CPU 101 illustrated in FIG. 4 and by the network I/F 111 illustrated in FIG. 4, and performs transmission/reception of various types of data (or information) to/from another terminal, apparatus, or system via the communication network 2. Before starting communication with a desired counterpart terminal, the data transmitter/receiver 11 starts receiving, from the management system 50, operation state information indicating the operation state of each terminal 10 serving as a candidate counterpart terminal.

The operation input acceptor 12 is realized by a command from the CPU 101 illustrated in FIG. 4 and by the operation keys 108 and the power switch 109 illustrated in FIG. 4, and accepts various inputs from the user. For example, when the user turns on the power switch 109 illustrated in FIG. 4, the operation input acceptor 12 illustrated in FIG. 6 accepts the power on operation and turns on the power.

The login requester 13 is realized by a command from the CPU 101 illustrated in FIG. 4, and, upon acceptance of the above-described power on operation, automatically transmits, from the data transmitter/receiver 11 to the management system 50 via the communication network 2, login request information indicating a login request, and the current IP address of the request sender terminal. In addition, when the user turns the power switch 109 from on to off, the data transmitter/receiver 11 transmits to the management system 50 state information indicating that the power is to be turned off, and then the operation input acceptor 12 completely turns off the power. Accordingly, the management system 50 side can detect that the power of the terminal 10 is turned from on to off.

The image capturer 14 is realized by a command from the CPU 101 illustrated in FIG. 4 and by the camera 112 and the imaging element I/F 113 illustrated in FIG. 4. The image capturer 14 captures an image of a subject and outputs image data obtained by capturing the image.

The sound input 15a is realized by a command from the CPU 101 illustrated in FIG. 4 and by the sound input/output I/F 116 illustrated in FIG. 4. After the voice of the user is converted to a sound signal by the microphone 114, the sound input 15a receives sound data according to this sound signal. The sound output 15b is realized by a command from the CPU 101 illustrated in FIG. 4 and by the sound input/output I/F 116 illustrated in FIG. 4, and outputs the sound signal according to the sound data to the speaker 115, and the speaker 115 outputs sound.

The display control 16 is realized by a command from the CPU 101 illustrated in FIG. 4 and by the display I/F 117 illustrated in FIG. 4, and performs control for transmitting image data to the external display 120.

The candidate list generator 18 generates and updates a candidate list in which the state of a candidate counterpart terminal such as that illustrated in FIG. 13 is indicated by an icon, on the basis of later-described candidate list information and the state information of each terminal 10 serving as a candidate counterpart terminal, which are received from the management system 50.

In addition, the data processor 19 is executed by a command from the CPU 101 illustrated in FIG. 4 and by the SSD 105 illustrated in FIG. 4, and performs processing to store various types of data in the non-volatile memory 1001 or to read various types of data stored in the non-volatile memory 1001. The non-volatile memory 1001 stores a terminal identification (ID) serving as an example of identification information for identifying the terminal 10, a password, and the like. Further, the data processor 19 also performs processing to store various types of data in the volatile memory 1002 or to read various types of data stored in the volatile memory 1002. Every time image data and sound data are received in performing communication with a counterpart terminal, the volatile memory 1002 overwrites and stores the image data and sound data. On the basis of image data before being overwritten, an image is displayed on the display 120, and, on the basis of sound data before being overwritten, sound is output from the speaker 115.

Note that a terminal ID and a later-described relay device ID in the embodiment indicate identification information such as a language, a character(s), a symbol(s), or various marks used to uniquely identify a corresponding terminal 10 and a corresponding relay device 30. In addition, a terminal ID and a relay device ID may be identification information including a combination of at least two of the above-mentioned language, character(s), symbol(s), and various marks.

<Functional Configuration of Management System>

The management system 50 includes a data transmitter/receiver 51, a terminal authenticator 52, a terminal manager 53, an extractor 54, a waiting list manager 55, a candidate list manager 57, and a data processor 59. These elements are functions that are realized by or elements that are caused to function by operating any of the elements illustrated in FIG. 5 in response to a command from the CPU 201 in accordance with a management system program expanded from the HD 204 to the RAM 203. In addition, the management system 50 includes a non-volatile memory 5000 in which the storage of various types of data (or information) is maintained even when the power of the management system 50 is turned off, and the non-volatile memory 5000 is configured by the HD 204 illustrated in FIG. 5. In addition, the non-volatile memory 5000 stores data of a candidate list frame illustrated in FIG. 13 (which is data of a candidate list frame portion illustrated in FIG. 13, and which includes no icon indicating a specific operation state, no terminal ID, or no terminal name).

(Terminal Authentication Management Table)

In the non-volatile memory 5000, a terminal authentication management DB 5001 configured by a terminal authentication management table such as that illustrated in FIG. 7 is stored. In the terminal authentication management table, a password is stored in association with each of terminal IDs of all terminals 10 managed by the management system 50. For example, the terminal authentication management table illustrated in FIG. 7 indicates that the terminal ID of the terminal 10aa is "01aa", and the password of the terminal 10aa is "aaaa".

(Terminal Management Table)

Also in the non-volatile memory 5000, a terminal management DB 5002 configured by a terminal management table such as that illustrated in FIG. 8 is stored. In the terminal management table, the terminal name serving as the counterpart terminal name of each terminal 10 in the case where the terminal 10 serves as a counterpart terminal, the operation state, and the IP address of the terminal 10 are stored in association with the terminal ID of the terminal 10. For example, the terminal management table illustrated in FIG. 8 indicates that the terminal 10aa whose terminal ID is "01aa" has the terminal name "AA terminal, Tokyo office, Japan", the operation state "online (communication OK)", and the IP address "1.2.1.3".

(Candidate List Management Table)

Further, in the non-volatile memory 5000, a candidate list management DB 5003 configured by a candidate list management table such as that illustrated in FIG. 9 is stored. In the candidate list management table, in association with the terminal ID of a request sender terminal that gives a request for starting communication in a videoconference, the terminal IDs of all counterpart terminals registered as candidate counterpart terminals to which the request sender terminal can give a request for starting communication are managed. For example, the candidate list management table illustrated in FIG. 9 indicates that counterpart terminals to which a request sender terminal (terminal 10aa) whose terminal ID is "01aa" can give a request for starting communication in a videoconference are the terminal 10ab whose terminal ID is "01ab", the terminal 10ba whose terminal ID is "01ba", the terminal 10db whose terminal ID is "01db", and so forth. The candidate counterpart terminals are updated by addition or deletion in response to an addition or deletion request from an arbitrary request sender terminal to the management system 50.

(Waiting List Management Table)

Further, in the non-volatile memory 5000, a waiting list management DB 5004 configured by a waiting list management table such as that illustrated in FIG. 10 is stored. In the waiting list management table, the terminal ID of a terminal (waiting terminal) that is waiting for a request for adding the waiting terminal 10 as a candidate counterpart terminal, a terminal name and a location serving as identification information for identifying the waiting terminal, and a waiting time indicating a time since the waiting terminal has started waiting are stored in association with one another. Note that the waiting time recorded in the waiting list management table is updated by the data processor 59 on the basis of an output of the clock 119.

<Functional Configuration of Management System>

Next, functional configuration of the management system 50 will be described in detail. Note that, in the following description of functional configuration of the management system 50, among elements illustrated in FIG. 5, relationships with main elements for realizing the functional configuration of the management system 50 will also be described.

The data transmitter/receiver 51 is executed by a command from the CPU 201 illustrated in FIG. 5 and by the network I/F 209 illustrated in FIG. 5, and performs transmission/reception of various types of data (or information) to/from another terminal, apparatus, or system via the communication network 2.

The terminal authenticator 52 is realized by a command from the CPU 201 illustrated in FIG. 5, and performs terminal authentication by searching the terminal authentication management DB 5001 (see FIG. 7) in the non-volatile memory 5000 by using a terminal ID and a password included in login request information received via the data transmitter/receiver 51 as search keys and determining whether the same pair of a terminal ID and a password is managed in the terminal authentication management DB 5001.

The terminal manager 53 is realized by a command from the CPU 201 illustrated in FIG. 5. In order to manage the operation state of a request sender terminal that has given a login request, the terminal manager 53 stores and manages, in the terminal management DB 5002 (see FIG. 8), the terminal ID, the operation state, and the IP address of this request sender terminal in association with one another. In addition, on the basis of operation state information sent from the terminal 10 indicating that power is to be turned off when the user turns the power switch 109 of the terminal 10 from on to off, the terminal manager 53 changes the operation state indicating an online state to an offline state in the terminal management DB 5002 (see FIG. 8).

The extractor 54 is realized by a command from the CPU 201 illustrated in FIG. 5, searches the candidate list management DB 5003 (see FIG. 9) by using the terminal ID of a request sender terminal that has given a login request as a key, and reads the terminal ID of a counterpart terminal that can communicate with the request sender terminal, thereby extracting the terminal ID. In addition, the extractor 54 searches the terminal management DB 5002 by using the terminal ID of a candidate counterpart terminal, extracted by the extractor 54, as a search key, and reads the operation state for each terminal ID extracted by the extractor 54. Accordingly, the extractor 54 can obtain the operation state of a candidate counterpart terminal that can communicate with a request sender terminal that has given a login request.

The waiting list manager 55 is realized by a command from the CPU 201 illustrated in FIG. 5, and, upon reception by the data transmitter/receiver 51 of waiting start information transmitted from the terminal 10, causes the waiting list management DB 5004 to additionally store the terminal ID and the identification information, which are included in the waiting start information. In addition, the waiting list manager 55 deletes the terminal ID and the identification information from the waiting list management DB 5004 upon reception by the data transmitter/receiver 51 of waiting end information transmitted from the terminal 10.

The candidate list manager 57 is realized by a command from the CPU 201 illustrated in FIG. 5, and adds or deletes the terminal ID of a counterpart terminal for the terminal ID of each request sender terminal in the candidate list management DB 5003 (see FIG. 9). In addition, the candidate list manager 57 additionally manages the terminal ID of a counterpart terminal in association with the terminal ID of a request sender terminal in the candidate list management DB 5003 (see FIG. 9).

The data processor 59 is executed by a command from the CPU 201 illustrated in FIG. 5 and the HDD 205 illustrated in FIG. 5, and performs processing to store various types of data in the non-volatile memory 5000 or read various types of data stored in the non-volatile memory 5000.

<Process or Operation>

Figure 11:
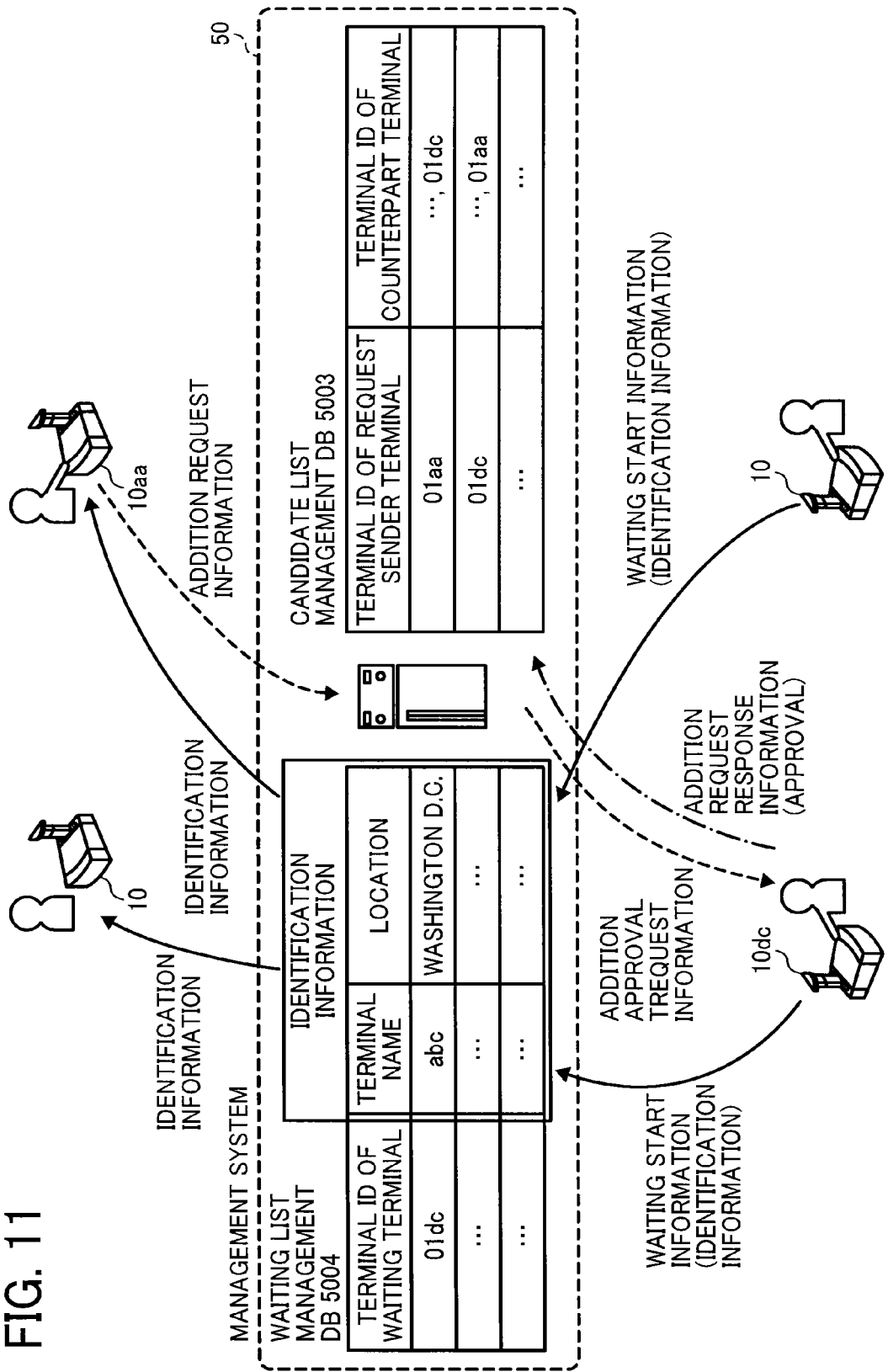
FIG. 11 is an illustration of transmission/reception of various types of information in the communication system.

Next, a process or an operation of the embodiment will be described. First, using FIG. 11, the outline of an operation or a process of the embodiment will be described. FIG. 11 is an illustration of transmission/reception of various types of information in the communication system.

The candidate list management DB 5003 of the management system 50 (an example of a terminal management system) stores, in association with each other, a terminal ID for identifying a terminal 10 serving as the sender of a request for starting communication (an example of request sender terminal identification information) and a terminal ID for identifying a terminal 10 serving as a candidate counterpart terminal that can communicate with the terminal 10 serving as the request sender (an example of counterpart terminal identification information). The data transmitter/receiver 51 of the management system 50 receives a request from the terminal 10aa (an example of a second communication terminal) for adding the terminal 10dc (an example of a first communication terminal), which is waiting for a request for adding the terminal as a candidate counterpart terminal, as a candidate counterpart terminal by notifying the terminal 10aa of identification information (the terminal name "abc", and the location "Washington D.C.") for identifying the terminal 10dc. In addition, the data transmitter/receiver 51 of the management system 50 accepts, from the terminal 10dc, a response to the request by notifying the terminal 10dc of information indicating the terminal 10aa, which sends the request. Upon acceptance by the data transmitter/receiver 51 of a response indicating an approval for the request, the candidate list manager 57 updates information managed in the candidate list management DB 5003 by causing the candidate list management DB 5003 to store the terminal ID "01dc" of the terminal 10dc serving as a candidate counterpart terminal in association with the terminal ID "01aa" of the terminal 10aa serving as a start request sender. Since the terminal 10aa sends a request for addition of a candidate counterpart terminal on the basis of identification information transmitted from the management system 50, the time and effort involved in a process of adding a candidate counterpart terminal is reduced.

In addition, upon acceptance by the data transmitter/receiver 51 of the management system 50 of a response indicating an approval for the request, the candidate list manager 57 updates information managed in the candidate list management DB 5003 by causing the candidate list management DB 5003 to store the terminal ID "01aa" of the terminal 10aa serving as a candidate counterpart terminal in association with the terminal ID "01dc" of the terminal 10dc serving as a start request sender. Accordingly, the time and effort spent by the terminal 10dc to give to the terminal 10aa a request for addition as a candidate counterpart terminal can be eliminated.

The waiting list management DB 5004 of the management system 50 manages, in association with the terminal ID of each terminal (waiting terminal) that is waiting for a request for adding the local terminal 10 as a candidate counterpart terminal, identification information (terminal name and location) for identifying this terminal 10. The data transmitter/receiver 51 of the management system 50 accepts a request for addition as a candidate counterpart terminal by notifying the terminal 10aa of a list of items of identification information managed in the waiting list management DB 5004 and causes the terminal 10aa to select identification information from the list. Accordingly, even in the case where a plurality of terminals 10 is simultaneously waiting for an addition request, a request for addition as a candidate counterpart terminal can be given by selecting desired identification information from the list.

The data transmitter/receiver 51 of the management system 50 receives identification information transmitted from a terminal 10. The waiting list management DB 5004 manages, in association with the terminal ID of the terminal 10 serving as the transmission source of the identification information, the identification information transmitted from this terminal 10. Accordingly, identification information is disclosed on the basis of information set by each terminal 10 side, thereby improving safety.

The operation input acceptor 12 of the terminal 10dc accepts an input of a request for starting or ending waiting for a request for adding the local terminal 10 as a candidate counterpart terminal, in response to operation of the operation keys 108 by the user of the terminal 10dc. Upon acceptance of the input of such a request, the data transmitter/receiver 11 transmits to the management system 50 waiting start information or waiting end information indicating the start or end of waiting. The waiting list management DB 5004 of the management system 50 manages the identification information of the terminal 10dc for a period from reception by the data transmitter/receiver 51 of waiting start information to reception by the data transmitter/receiver 51 of waiting end information. Accordingly, the period in which the identification information is disclosed is limited, thereby improving safety.

Next, using FIGS. 12 to 19, a process of the embodiment will be described in detail. First, a process of transmitting/receiving management information at a preparation stage before the terminal 10aa participates in a content data session sed will be described using FIGS. 12 and 13. FIG. 12 is a sequence diagram illustrating a process at a preparation stage for starting communication between terminals. FIG. 13 is an illustration of a candidate list. Note that FIG. 12 illustrates a process of transmitting/receiving various items of management information entirely by a management information session sei.

First, when the user of the terminal 10aa turns on the power switch 109 illustrated in FIG. 4, the operation input acceptor 12 illustrated in FIG. 6 accepts the power on operation and turns on the power (step S1). In response to acceptance of the power on operation, the login requester 13 automatically transmits login request information indicating a login request from the data transmitter/receiver 11 to the management system 50 via the communication network 2 (step S2). The login request information includes a terminal ID for identifying the terminal 10aa serving as a request sender, and a password. The terminal ID and the password are data that have been read via the data processor 19 from the non-volatile memory 1001 and sent to the data transmitter/receiver 11. In the case of transmitting login request information from the terminal 10aa to the management system 50, the management system 50, which is a receiving side, can detect the IP address of the terminal 10aa, which is a transmitting side.

Next, the terminal authenticator 52 of the management system 50 performs terminal authentication by searching the terminal authentication management DB 5001 (see FIG. 7) of the non-volatile memory 5000 by using the terminal ID and the password included in the login request information received via the data transmitter/receiver 51 as search keys, and determining whether the same terminal ID and the same password are managed in the terminal authentication management DB 5001 (step S3). In the case where the terminal authenticator 52 determines that the login request is a login request from a terminal 10 that has a legitimate use authority since the same terminal ID and the same password are managed, the terminal manager 53 stores, in the terminal management DB 5002 (see FIG. 8), for each record indicated by the terminal ID and terminal name of the terminal 10aa, the operation state, and the IP address of the terminal 10aa in association with one another (step S4). Accordingly, the operation state "online (communication OK)" and the IP address "1.2.1.3" are managed in association with the terminal ID "01aa" in the terminal management table illustrated in FIG. 8.

The data transmitter/receiver 51 of the management system 50 transmits authentication result information indicating an authentication result obtained by the terminal authenticator 52 to the terminal 10aa, which has given the above-mentioned login request, via the communication network 2 (step S5). In the embodiment, the case in which it has been determined by the terminal authenticator 52 that the terminal 10aa is a terminal that has a legitimate use authority will be described as follows.

In response to reception, by the terminal 10aa, of the authentication result information indicating that the request sender terminal is a terminal that has a legitimate use authority, the data transmitter/receiver 11 transmits candidate list request information indicating a request for a candidate list to the management system 50 via the communication network 2 (step S6). Accordingly, the data transmitter/receiver 51 of the management system 50 receives the candidate list request information.

Next, the extractor 54 searches the candidate list management DB 5003 (see FIG. 9) by using the terminal ID "01aa" of the terminal 10aa which has given a login request as a search key, and extracts the terminal ID of each terminal 10 (counterpart terminal) serving as a candidate for a counterpart terminal that can communicate with the terminal 10aa. At the same time, the extractor 54 reads and extracts a counterpart terminal name (terminal name) corresponding to this extracted terminal ID from the terminal management DB 5002 (see FIG. 8) (step S7). Here, the terminal IDs ("01ab", "01ba", and "01db") of counterpart terminals (terminals (10ab, 10ba, and 10db)) corresponding to the terminal ID "01aa" of the terminal 10aa, and terminal names ("AB terminal, Tokyo office, Japan", "BA terminal, Osaka office, Japan", and "DB terminal, Washington D.C. office, U.S.") corresponding thereto are extracted.

Next, the data transmitter/receiver 51 of the management system 50 reads data of a candidate list frame from the non-volatile memory 5000 via the data processor 59 (step S8), and transmits, to the terminal 10aa, "candidate list information (candidate list frame, terminal IDs, and counterpart terminal names)" including this candidate list frame, and the terminal IDs and counterpart terminal names extracted by the extractor 54 (step S9). Accordingly, in the terminal 10aa, the data transmitter/receiver 11 receives the candidate list information, and the data processor 19 stores the candidate list information in the volatile memory 1002 (step S10).

In addition, the extractor 54 of the management system 50 searches the terminal management DB 5002 (see FIG. 8) by using the terminal IDs ("01ab", "01ba", and "01db") of the counterpart terminals, which are extracted by the above-mentioned extractor 54, as search keys, and reads a corresponding operation state for each terminal ID extracted by the above-mentioned extractor 54, thereby obtaining the operation state of each of the counterpart terminals (terminals (10ab, 10ba, and 10db)) (step S11).

Next, the data transmitter/receiver 51 transmits "terminal operation state information" including the terminal ID "01ab" serving as a search key used in step S7 described above and the operation state "offline" of a corresponding counterpart terminal (terminal 10ab) to the terminal 10aa via the communication network 2 (step S12). In addition, as part of step S12, the data transmitter/receiver 51 also separately transmits the remaining "terminal operation state information", such as "terminal operation state information" including the terminal ID "01ba" and the operation state "online (communication OK)" of a corresponding counterpart terminal (terminal 10ba), to the terminal 10aa.

Next, the data processor 19 of the terminal 10aa sequentially stores the terminal state information, received from the management system 50, in the volatile memory 1002 (step S13). Thus, by receiving the above-described state information of each terminal, the terminal 10aa can obtain the current operation state of each counterpart terminal, such as the terminal 10ab, that can communicate with the terminal 10aa.

Next, the candidate list generator 18 of the terminal 10aa generates a candidate list in which the state of a terminal 10 serving as a candidate counterpart terminal is reflected, on the basis of the candidate list information and the terminal state information stored in the volatile memory 1002, and controls the timing at which the display control 16 displays the candidate list on the display 120 illustrated in FIG. 4 (step S14). Note that, in the candidate list illustrated in FIG. 13, an icon indicating the operation state of each terminal 10 indicates the following from top: "offline", "online (communication OK)", and "online (communicating)".

When the user of another terminal 10 turns on the power switch 109 illustrated in FIG. 4, as in step S1 described above, the operation input acceptor 12 illustrated in FIG. 5 accepts the power on operation, and performs processing that is the same as steps S2 to S14 described above, a description of which will be omitted.

Figure 14A:
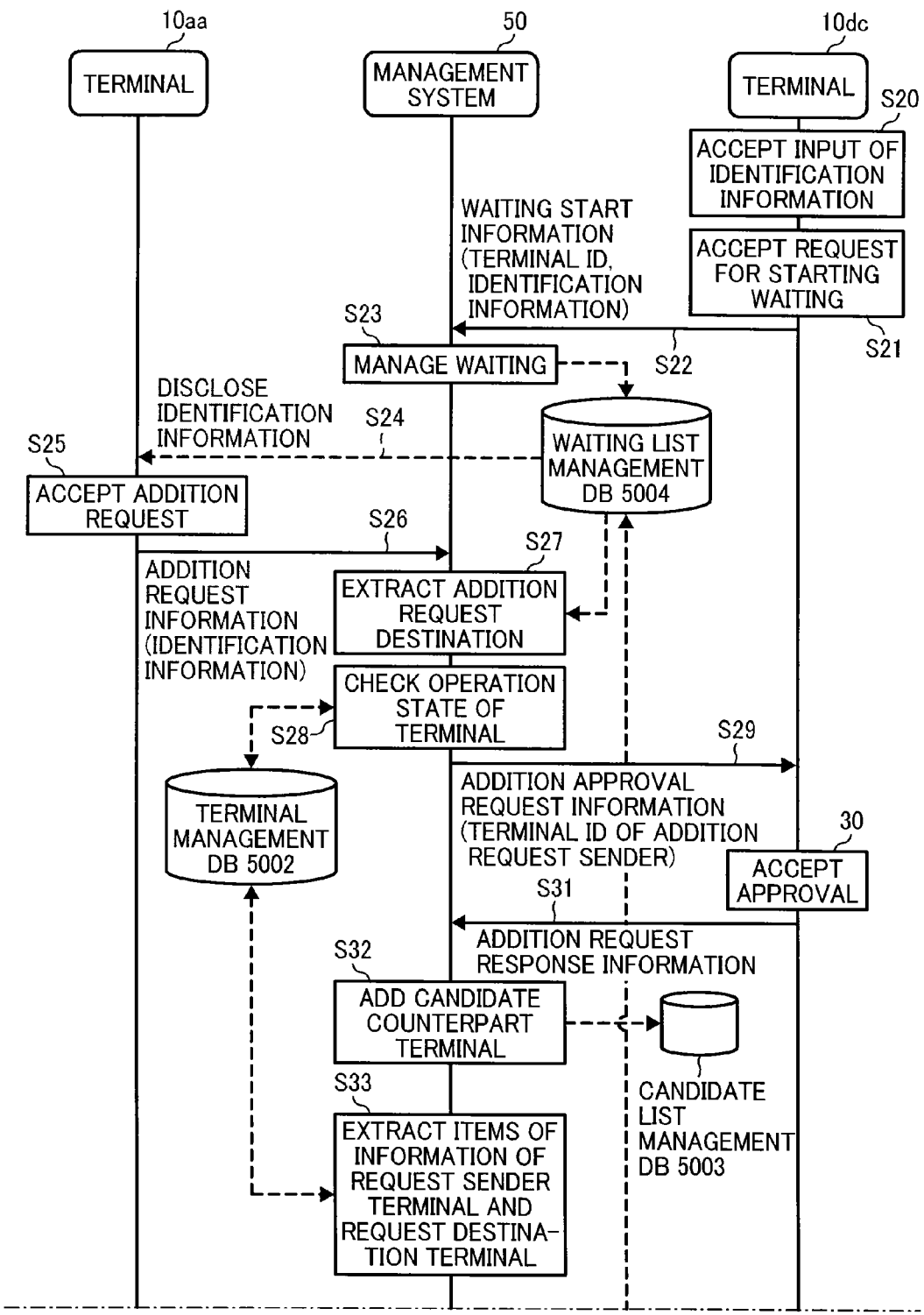
FIGS. 14A and 14B (FIG. 14) are a sequence diagram illustrating operation of adding a candidate counterpart terminal, according to an example embodiment of the present invention.
Figure 14B:
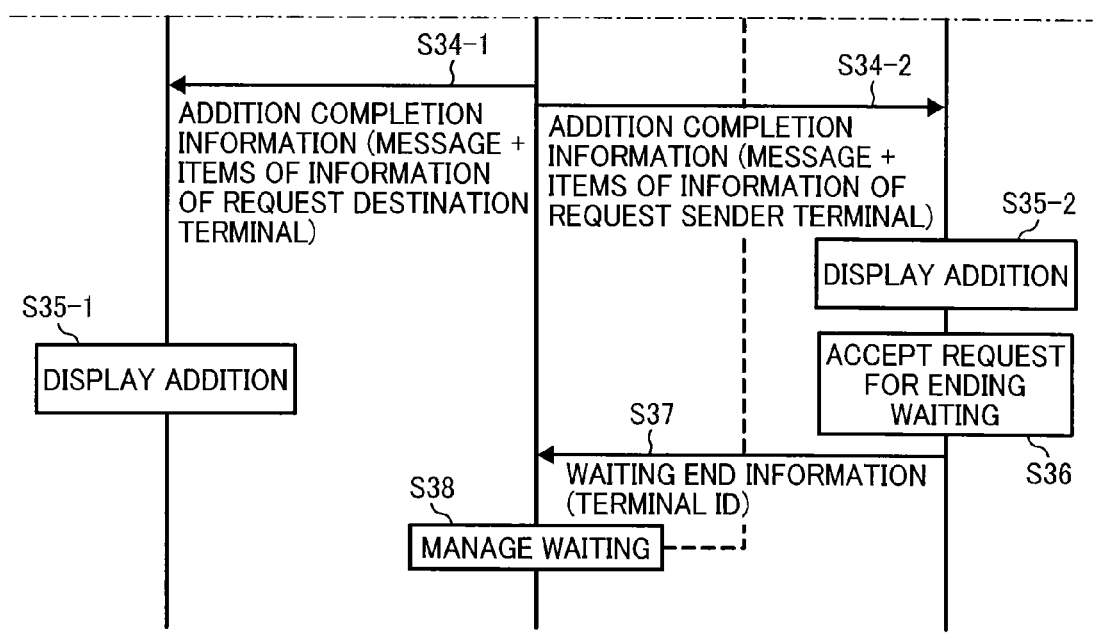

Next, using FIGS. 14 to 19, a candidate counterpart terminal adding process will be described. FIG. 14 is a sequence diagram illustrating operation of adding a candidate counterpart terminal. FIGS. 15 to 19 are illustrations of transmission/reception of various types of information in the communication system. The embodiment discusses the case in which the terminal 10aa adds the terminal 10dc as a candidate counterpart terminal of the terminal 10aa.

The terminal 10dc has been logged in to the management system 50 by performing the same process as steps S1 to S5. In response to user operation by the user of the terminal 10dc through the operation keys 108, the operation input acceptor 12 accepts an input of identification information (the terminal name "abc" and the location "Washington D.C.") for identifying the terminal 10dc (step S20). In this case, the user of the terminal 10dc may input the terminal name and the location as the identification information, or may input one of the terminal name and the location as the identification information. In addition, information input as the identification information may be different from information such as a terminal name managed in the terminal management DB 5002 (see FIG. 8). Since other terminals 10 will be notified of the input items of identification information by later-described processing, the user of the terminal 10dc can input appropriate identification information while taking into consideration security and/or identifiability.

Next, when the user of the terminal 10dc presses the operation keys 108, the operation input acceptor 12 notifies other communication terminals 10 of the identification information of the terminal 10dc, thereby accepting a request for starting waiting for a request for addition as a candidate counterpart terminal (step S21). Hereinafter, the description will be given while representing the terminal 10dc as a waiting terminal.

Next, the data transmitter/receiver 11 of the waiting terminal (terminal 10dc) transmits waiting start information indicating the start of waiting for addition as a candidate counterpart terminal to the management system 50 via the communication network 2 (step S22). The waiting start information includes the terminal ID "01dc" of the waiting terminal (terminal 10dc), and, as identification information for identifying the waiting terminal (terminal 10dc), the terminal name "abc" and the location "Washington D.C." input in step S20. Note that the non-volatile memory 1001 of the terminal 10dc may store default identification information. In this case, the data transmitter/receiver 11 may transmit default identification information stored in the data processor 19, instead of the identification information input in step S20, to the management system 50. Accordingly, the user of the terminal 10dc does not need to input identification information whenever giving a request for starting waiting.

The waiting start information transmitted by the terminal 10dc is received by the data transmitter/receiver 51 of the management system 50. The waiting list manager 55 of the management system 50 stores the terminal ID "01dc" and the identification information (the terminal name "abc" and the location "Washington D.C.") included in the waiting start information in association with each other in the waiting list management DB 5004 (see FIG. 10) (step S23).

Figure 15:
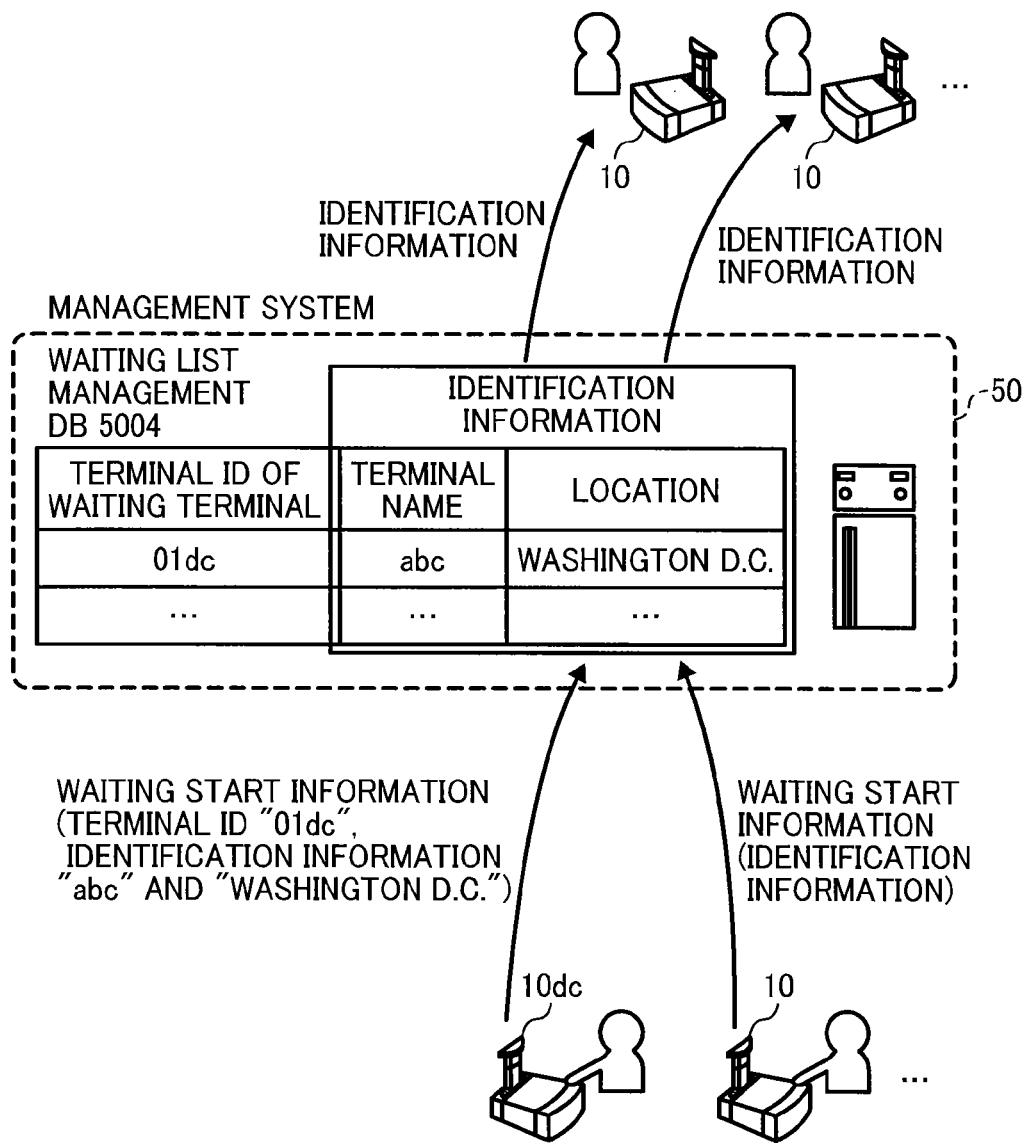
FIG. 15 is an illustration of transmission/reception of various types of information in the communication system.

The data transmitter/receiver 51 of the management system 50 discloses (or gives a notification of) a list of items of identification information managed in the waiting list management DB 5004 to a terminal 10 that is currently logged in to the management system 50 (step S24, see FIG. 15). Note that FIG. 15 is an illustration of a transmission/reception state of various types of information in the communication system 1. Although the method of disclosing the identification information is not particularly limited, pull notification may be given as an example. For example, in the case where the management system 50 has a web server function, in response to a request from a terminal 10, the data transmitter/receiver 51 may generate a HyperText Markup Language (HTML) document including a list of items of identification information managed in the waiting list management DB 5004, and transmit the HTML document to the terminal 10 serving as the request sender. In any case, the data transmitter/receiver 51 transmits a list of items of identification information to a terminal 10 that is currently logged in, thereby accepting a request for addition as a candidate counterpart terminal from the terminal 10 to which the list has been transmitted.

Upon reception by the terminal 10aa of the identification information, the display control 16 displays the list of items of identification information on the display 120aa. By operating the operation keys 108, the user of the terminal 10aa selects identification information (the terminal name "abc" and the location "Washington D.C.") for identifying the terminal 10dc, which is the destination of a request for addition as a candidate counterpart terminal, from the displayed list of items of identification information. Accordingly, the operation input acceptor 12 accepts an input of a request for adding the terminal 10 identified by the identification information (the terminal name "abc" and the location "Washington D.C.") as a candidate counterpart terminal of the terminal 10aa (step S25). Next, the data transmitter/receiver 11 transmits addition request information including the selected identification information (the terminal name "abc" and the location "Washington D.C.") and indicating a request for addition as a candidate counterpart terminal to the management system 50. Accordingly, the data transmitter/receiver 51 of the management system 50 receives the addition request information.

Next, in the management system 50, the data processor 59 extracts, as the terminal ID of the terminal 10 which is the addition request destination, the terminal ID "01dc" of the waiting terminal corresponding to the identification information (the terminal name "abc" and the location "Washington D.C.") included in the addition request information (step S27).

Figure 16:
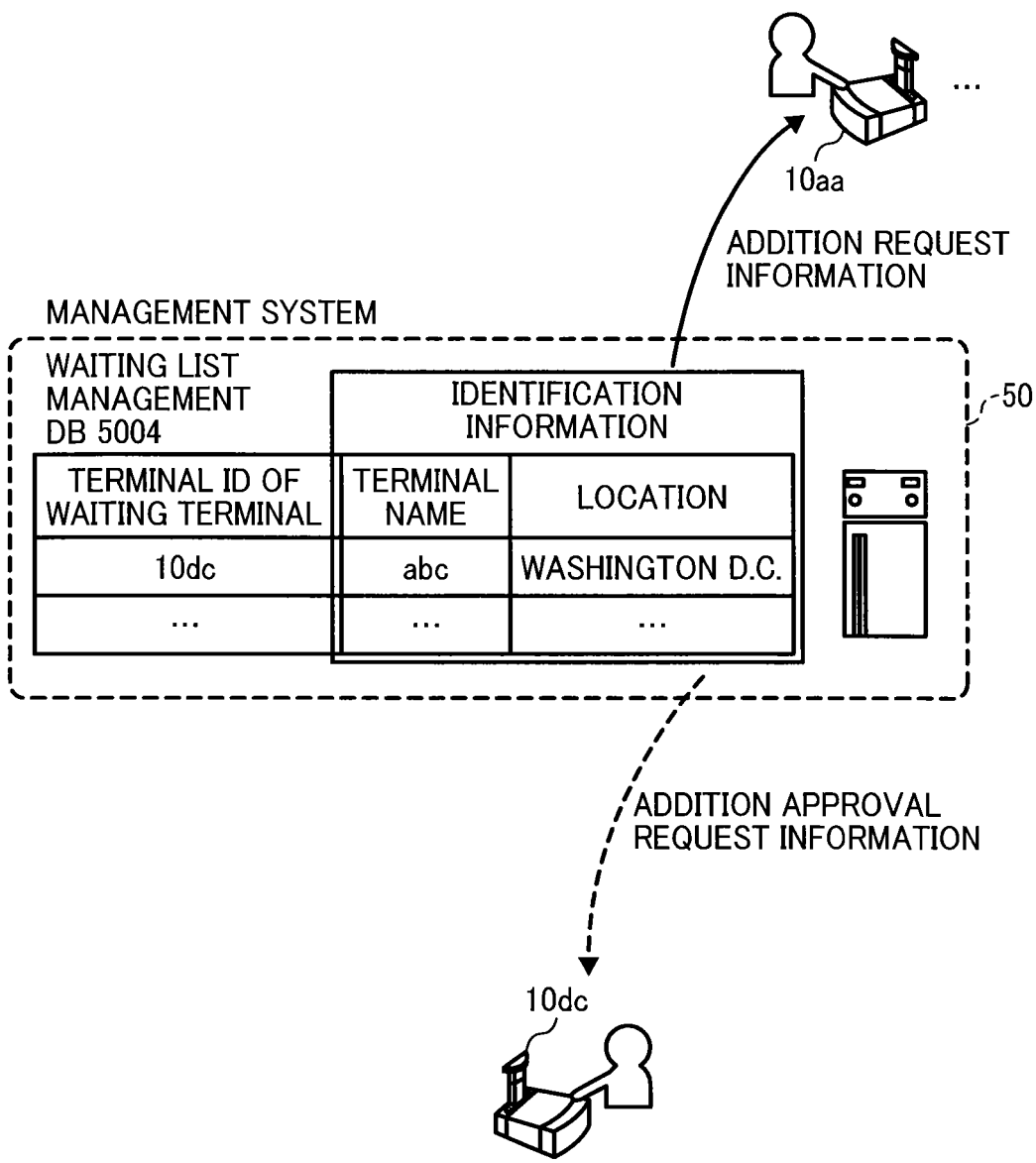
FIG. 16 is an illustration of transmission/reception of various types of information in the communication system.

Next, the terminal manager 53 searches the terminal management DB 5002 (see FIG. 8) on the basis of the terminal ID "01dc" of the terminal 10 which is the addition request destination, thereby checking a corresponding operation state (step S28). In the case where the terminal manager 53 determines that the operation state is online but the terminal 10 which is the addition request destination has not started communicating, the data transmitter/receiver 51 continuously transmits, to the terminal 10dc which is the addition request destination, addition approval request information indicating a request for a response indicating whether to approve the above-mentioned addition request (step S29, see FIG. 16). Note that FIG. 16 is an illustration of a transmission/reception state of various types of information in the communication system 1. The addition approval request information includes the terminal ID "01aa" of the terminal 10aa, which is the addition request sender. Accordingly, the data transmitter/receiver 11 of the terminal 10dc, which is the addition request destination, receives the addition approval request information.

Next, on the basis of the operation of the operation keys 108 by the user of the terminal 10dc, which is the addition request destination, the operation input acceptor 12 accepts an input of "approval" for addition as a candidate counterpart terminal (step S30).

Next, the data transmitter/receiver 11 of the terminal 10dc, which is the addition request destination, transmits addition request response information indicating a response indicating whether the addition request has been approved to the management system 50 via the communication network 2 (step S31). Accordingly, the data transmitter/receiver 51 of the management system 50 receives the addition request response information. Here, the case in which the addition request response information indicates "approval" will be continuously described.

Next, the candidate list manager 57 additionally registers the terminal ID "01dc" of the terminal 10dc, which is the addition request destination, as the terminal ID of a counterpart terminal corresponding to the terminal ID "01aa" of the request sender terminal in the candidate list management DB 5003 (see FIG. 9) (step S32). In addition, the terminal ID "01aa" of the addition request sender terminal is additionally registered as the terminal ID of a counterpart terminal corresponding to the terminal ID "01dc" of the request sender terminal in the candidate list management DB 5003.

Figure 17:
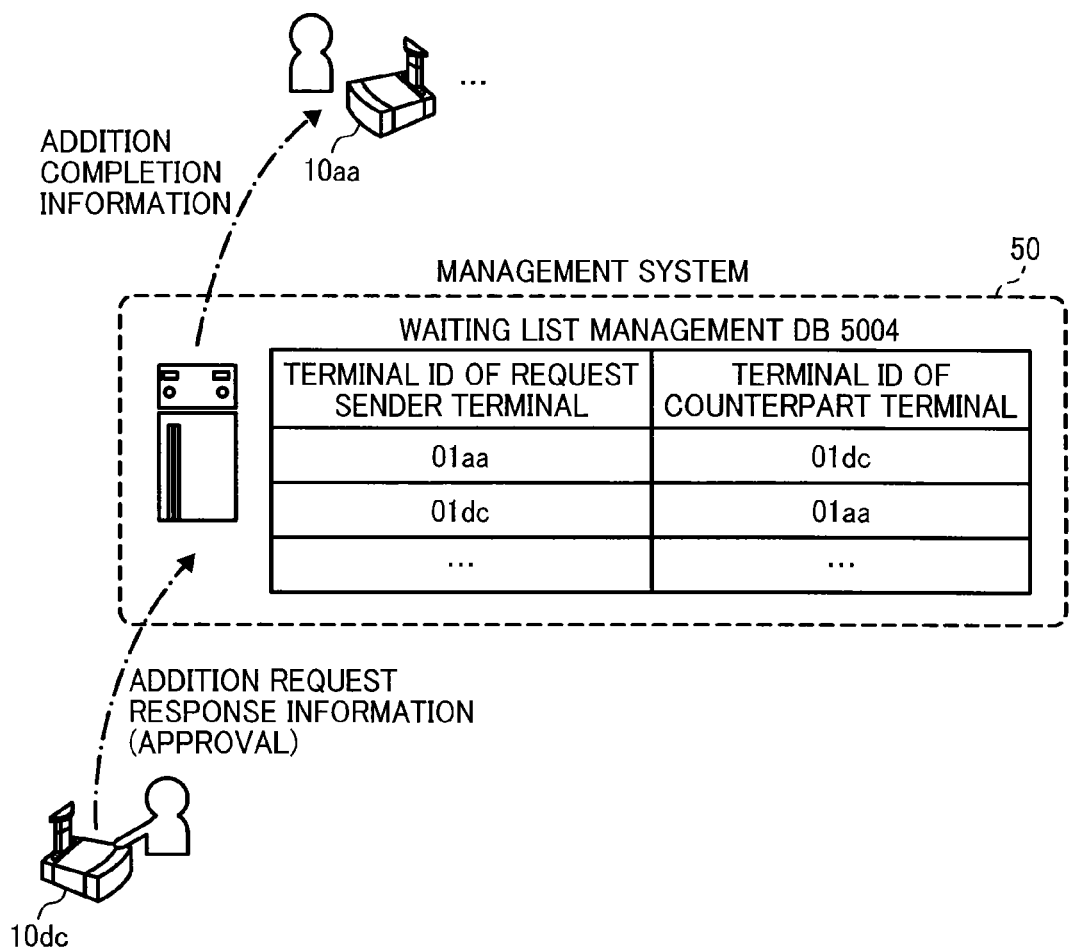
FIG. 17 is an illustration of transmission/reception of various types of information in the communication system.

Next, the extractor 54 searches the terminal management DB 5002 (see FIG. 8) on the basis of the terminal ID "01aa" of the terminal 10aa, which is the addition request sender, and the terminal ID "01dc" of the terminal 10dc, which is the addition request destination, thereby extracting items of corresponding information (terminal name and operation state) (step S33). Next, the data transmitter/receiver 51 transmits addition completion information to each of the terminal 10aa, which is the addition request sender, and the terminal 10dc, which is the addition request destination (steps S34-1 and S34-2, see FIG. 17). Note that FIG. 17 is an illustration of a transmission/reception state of various types of information in the communication system 1. Of these items of addition completion information, one transmitted to the terminal 10aa, which is the addition request sender, includes a message indicating that the addition is completed, and items of information (terminal ID, terminal name, and operation state) of the terminal 10dc, which is the addition request destination. That is, only items of information (terminal ID, terminal name, and operation state) of the terminal 10dc portion, which is the addition request destination, in the candidate list are transmitted to the terminal 10aa, which is the addition request sender, and the entire candidate list is not transmitted again. In contrast, of these items of addition completion information, one transmitted to the terminal 10dc, which is the addition request destination, includes a message indicating that the addition is completed, and items of information (terminal ID, terminal name, and operation state) of the terminal 10aa, which is the addition request sender.

In the terminal 10aa, which is the addition request sender, and the terminal 10dc, which is the addition request destination, each display control 16 displays a screen indicating completion on a corresponding one of the displays (120aa and 120dc) (steps S35-1 and S35-2).

Figure 18:
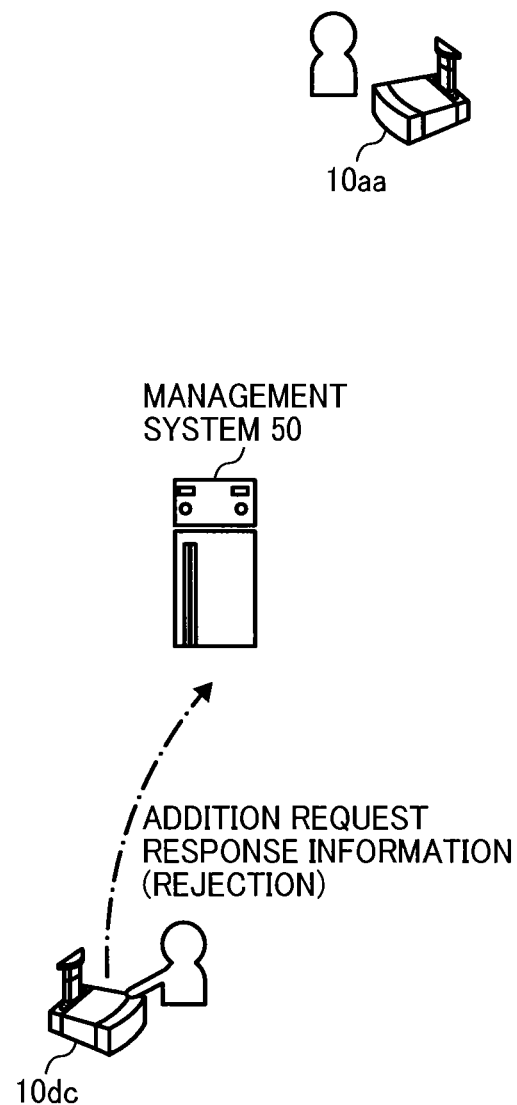
FIG. 18 is an illustration of transmission/reception of various types of information in the communication system.

Note that, in the case where the addition request response information indicates "rejection", the management system 50 does not execute the processing in steps S32 to S34-1 or S34-2 (see FIG. 18). Note that FIG. 18 is an illustration of a transmission/reception state of various types of information in the communication system 1. In the case where the addition request response information indicates "rejection", it may be considered that the users of the terminals (10aa and 10dc) may not be related to each other. Therefore, the information of each terminal 10 is prevented from being exchanged by not executing the processing in steps S32 to S34-1 or S34-2, thereby improving safety.

In the case of ending waiting for a request for addition as a candidate counterpart terminal, the operation input acceptor 12 accepts, on the basis of the operation of the operation keys 108 by the user of the terminal 10dc, an input of a request for ending waiting for a request for addition as a candidate counterpart terminal (step S36). Although the operation of the operation keys 108 in this case is not particularly limited, for example, the user may release his/her hand from the operation keys 108, which had been pressed in order to start waiting. After the user of the terminal 10dc presses the operation keys 108 in order to give a request for starting waiting, the user will eventually release his/her hand from the operation keys 108, and hence, an input of a request for ending waiting can be certainly accepted.

Next, the data transmitter/receiver 11 of the terminal 10dc transmits waiting end information indicating the end of waiting for a request for addition as a candidate counterpart terminal to the management system 50 via the communication network 2 (step S37). The waiting end information includes the terminal ID of the terminal 10dc.

Figure 19:
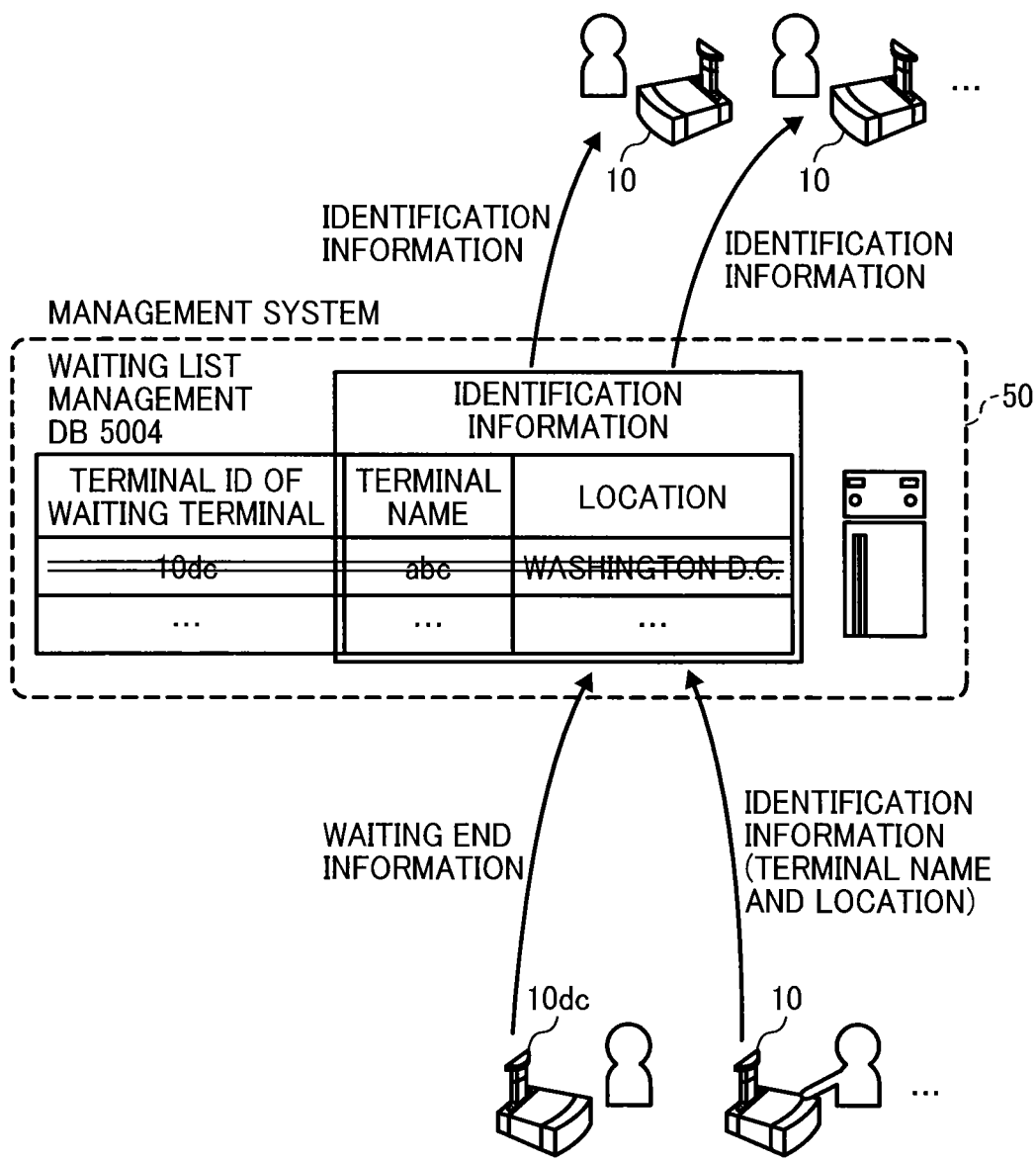
FIG. 19 is an illustration of transmission/reception of various types of information in the communication system.

Upon reception of the waiting end information, transmitted by the terminal 10dc, by the data transmitter/receiver 51 of the management system 50, the waiting list manager 55 deletes each record in which the terminal ID "01dc" of the terminal 10dc is recorded as the terminal ID of a waiting terminal in the waiting list management DB 5004 (see FIG. 10) (step S38). Accordingly, the identification information of the terminal 10dc is prevented from being disclosed to other terminals 10 (see step S24 and FIG. 19). Note that FIG. 19 is an illustration of a transmission/reception state of various types of information in the communication system 1. Note that, in the case where a waiting time recorded in the waiting list management DB 5004 exceeds a certain time (such as three minutes), the waiting list manager 55 may delete each record associated with the waiting time exceeding the certain time. Accordingly, even in the case where an input of a request for ending waiting is forgotten, identification information can be deleted, thereby improving safety.

When updating of information managed in the candidate list management DB 5003 is completed by the above-described processes, the terminal 10aa can specify the terminal 10dc as a counterpart terminal and give a request for starting communication. Upon reception of this request, the management system 50 performs control to establish a content data session sed between the terminal 10aa and the terminal 10dc by performing any desired known method. For example, the session may be established as described in the description related to FIGS. 2 and 3A to 3C of U.S. Patent Application Publication No. 2013-0223292, the contents of which is incorporated herein by reference.

The communication management system according to the embodiment of the present invention notifies a second communication terminal of identification information for identifying a first communication terminal waiting for a request for adding the first communication terminal as a candidate counterpart terminal, thereby accepting a request from the second communication terminal for adding the first communication terminal as a candidate counterpart terminal. Since the second communication terminal side can give a request for addition of a candidate counterpart terminal on the basis of identification information transmitted from the communication management system, the time and effort involved in giving a request for adding a candidate counterpart terminal can be reduced.

Since the time and effort involved in inputting can be saved according to the above, an input device can be simplified in a communication terminal used in a videoconference or the like, such that the number of keys for inputting characters can be reduced to minimum. Simplification of an input device enables further miniaturization of a terminal.

The relay devices 30, the management system 50, and the program providing system 90 in the above-described embodiment may be configured by a single computer or a plurality of computers to which divided portions (functions) are arbitrarily allocated.

In addition, in the case where the program providing system 90 is configured by a single computer, a program transmitted by the program providing system 90 may be separately transmitted in units of a plurality of modules, or may be transmitted in its entirety.

Further, in the case where the program providing system 90 is configured by a plurality of computers, a program may be divided into a plurality of modules, and the modules may be individually transmitted from the respective computers.

In addition, a recording medium such as a compact disc read-only memory (CD-ROM) storing a terminal control program, a relay device program, or a communication management program in the above-described embodiment, the HD 204 storing these programs, and the program providing system 90 including the HD 204 are each used in the case where the terminal control program, relay device program, or communication management program is provided as a program product to users within a certain country or outside that country.

Further, although management is performed while paying attention to the resolution of an image of image data relayed by the relay device 30, which serves as an example of the quality of the image of the image data, the embodiment is not limited to this case, and management may be performed while paying attention to other examples of the quality, such as the depth of the quality of image data, the sampling frequency of sound of sound data, or the bit length of sound of sound data. In addition, sound data may be transmitted/received separately in items of data of three types of resolutions (high resolution, intermediate resolution, and low resolution).

Although the IP address of each terminal 10 is managed in FIG. 8, the embodiment is not limited to this case, and any information for identifying each terminal 10 in the communication network 2, such as the fully qualified domain name (FQDN) of each terminal 10, may be managed. In this case, an IP address corresponding to an FQDN is obtained by a Domain Name System (DNS) server.

In addition, although the case of a videoconference system has been described as an example of the communication system 1 in the above-described embodiment, the embodiment is not limited to this case, and the communication system 1 may be a phone system such as an IP phone system or an Internet phone system.

In addition, the communication system 1 may be a car navigation system. In this case, for example, one of two terminals 10 corresponds to a car navigation apparatus mounted on a car, and the other terminal 10 corresponds to a management terminal or a management server of a management center that manages car navigation, or a car navigation apparatus mounted on another car. In addition, the terminals 10 may be configured by cellular phones in the communication system 1.

In addition, although image data and sound data are described as examples of content data in the above-described embodiment, the content data is not limited to these items of data, and the content data may be touch data. In this case, a feeling obtained by a user's contact at one terminal side is transmitted to the other terminal side.

Further, the content data may be smell data. In this case, a smell at one terminal side is transmitted to the other terminal side. In addition, the content data may be at least one of image data, sound data, touch data, and smell data.

In addition, although the case in which a videoconference is held by the communication system 1 has been described in the above-described embodiment, the embodiment is not limited to this case. The communication system 1 may be used in meetings, general conversation between family members or friends, or one-way presentation of information.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:
1. A terminal management system, comprising:
   a memory that stores first identification information in association with second identification information, the first identification information for identifying a first communication terminal as a terminal to request starting of communication, and the second identification information for identifying a second communication terminal as a candidate communication counterpart terminal of the first communication terminal;
   a transmitter that transmits
      third identification information to the first communication terminal, the third identification information for identifying a third communication terminal that is not stored in the memory in association with the first identification information, to accept a request from the first communication terminal to add the third communication terminal as a candidate counterpart communication terminal of the first communication terminal, and the first identification information, to the third communication terminal, to accept a response transmitted from the third communication terminal in reply to the request; and circuitry that, when the response indicates an approval of the request, stores in the memory the third identification information as a candidate communication counterpart terminal of the first communication terminal.

2. The terminal management system of claim 1, wherein the transmitter further transmits the request of the first communication terminal to the third communication terminal.

3. The terminal management system of claim 2, wherein the transmitter transmits the first identification information to the third communication terminal for display by the third communication terminal.

4. The terminal management system of claim 3, wherein the first identification information includes information that is input by a user of the first communication terminal.

5. The terminal management system of claim 2, wherein the memory further stores the first identification information in response to receiving a notification that the first communication terminal is waiting to be registered.

6. The terminal management system of claim 5, wherein the circuitry deletes the first identification information that is waiting to be registered, in response to receiving a notification that indicates that the first communication terminal is no longer waiting to be registered.

7. The terminal management system of claim 5, wherein the circuitry deletes the first identification information that is waiting to be registered, when a preset time period elapses after receiving the notification that the first communication terminal is waiting to be registered.

8. The terminal management system of claim 5, wherein, when the first communication terminal includes a plurality of first communication terminals, the transmitter further transmits identification information of each one of the plurality of first communication terminals that are waiting to be registered, to the third communication terminal for display to request the third communication terminal to select at least one of the plurality of first communication terminals to be registered.

9. A communication system, comprising:
the terminal management system of claim 1;
the first communication terminal; and
the second communication terminal.

10. A method of controlling registration of communication terminals, the method comprising:
storing, in a memory, first identification information in association with second identification information, the first identification information for identifying a first communication terminal as a terminal to request starting of communication, and the second identification information for identifying a second communication terminal as a candidate communication counterpart terminal of the first communication terminal;

transmitting third identification information to the first communication terminal, the third identification information for identifying a third communication terminal that is not stored in the memory in association with the first identification information, to accept a request from the first communication terminal to add the third communication terminal as a candidate counterpart communication terminal of the first communication terminal;

transmitting the first identification information, to the third communication terminal, to accept a response transmitted from the third communication terminal in reply to the request; and storing in the memory, when the response indicates an approval of the request, the third identification information as a candidate communication counterpart terminal of the first communication terminal.

11. A non-transitory recording medium storing a plurality of instructions which, when executed by one or more processors, cause the processors to perform a process of controlling registration, the process comprising:

storing first identification information in association with second identification information, the first identification information for identifying a first communication terminal as a terminal to request starting of communication, and the second identification information for identifying a second communication terminal as a candidate communication counterpart terminal of the first communication terminal;

transmitting third identification information to the first communication terminal, the third identification information for identifying a third communication terminal that is not stored in association with the first identification information, to accept a request from the first communication terminal to add the third communication terminal as a candidate counterpart communication terminal of the first communication terminal;

transmitting the first identification information, to the third communication terminal, to accept a response transmitted from the third communication terminal in reply to the request; and storing, when the response indicates an approval of the request, the third identification information as a candidate communication counterpart terminal of the first communication terminal.

* * * * *